United States Patent [19]

Mischler et al.

[11] Patent Number: 4,754,491

[45] Date of Patent: Jun. 28, 1988

[54] COSINE TRANSFORM COMPUTING DEVICES, AND IMAGE CODING DEVICES AND DECODING DEVICES COMPRISING SUCH COMPUTING DEVICES

[75] Inventors: Denis Mischler, Acigne; Yves Le Pannerer, St. Gregoire, both of France

[73] Assignee: Thomson Grand Public, Paris, France

[21] Appl. No.: 860,009

[22] Filed: May 5, 1986

[30] Foreign Application Priority Data

May 3, 1985 [FR] France ............................. 85 06771

[51] Int. Cl.⁴ ...................... G06K 9/00; G06F 15/332
[52] U.S. Cl. ..................................... 382/41; 364/725; 364/826
[58] Field of Search .................... 364/725, 826; 382/41

[56] References Cited

U.S. PATENT DOCUMENTS 4,196,448  4/1980  Whitehouse et al. ............... 364/725
4,449,194  5/1984  Wilhelm ............................. 364/725

Primary Examiner—Leo H. Boudreau
Attorney, Agent, or Firm—Cushman, Darby & Cushman

[57] ABSTRACT

The invention provides cosine transform computing devices and image decoding devices and coding devices comprising such computing devices. One embodiment of a device for calculating monodimensional cosine transforms by blocks of 16 values comprises: three elementary computing devices for carrying out operations of the addition or subtraction type; two elementary computing devices for carrying out operations of the multiplication and accumulation type; a coupling device; and control means. The number of elementary computing devices is equal to the minimum number required for carrying out the transform calculations at the timing imposed by the arrival of the values to be transformed. Each elementary computing device is reused several times for the calculation of each transform. The coupling device is controlled by the control means for connecting the elementary computing devices in series in an order which varies at each step of the succession of calculations. The coupling device comprises three fixed delay devices for delaying the transmission of certain digital values.

12 Claims, 15 Drawing Sheets

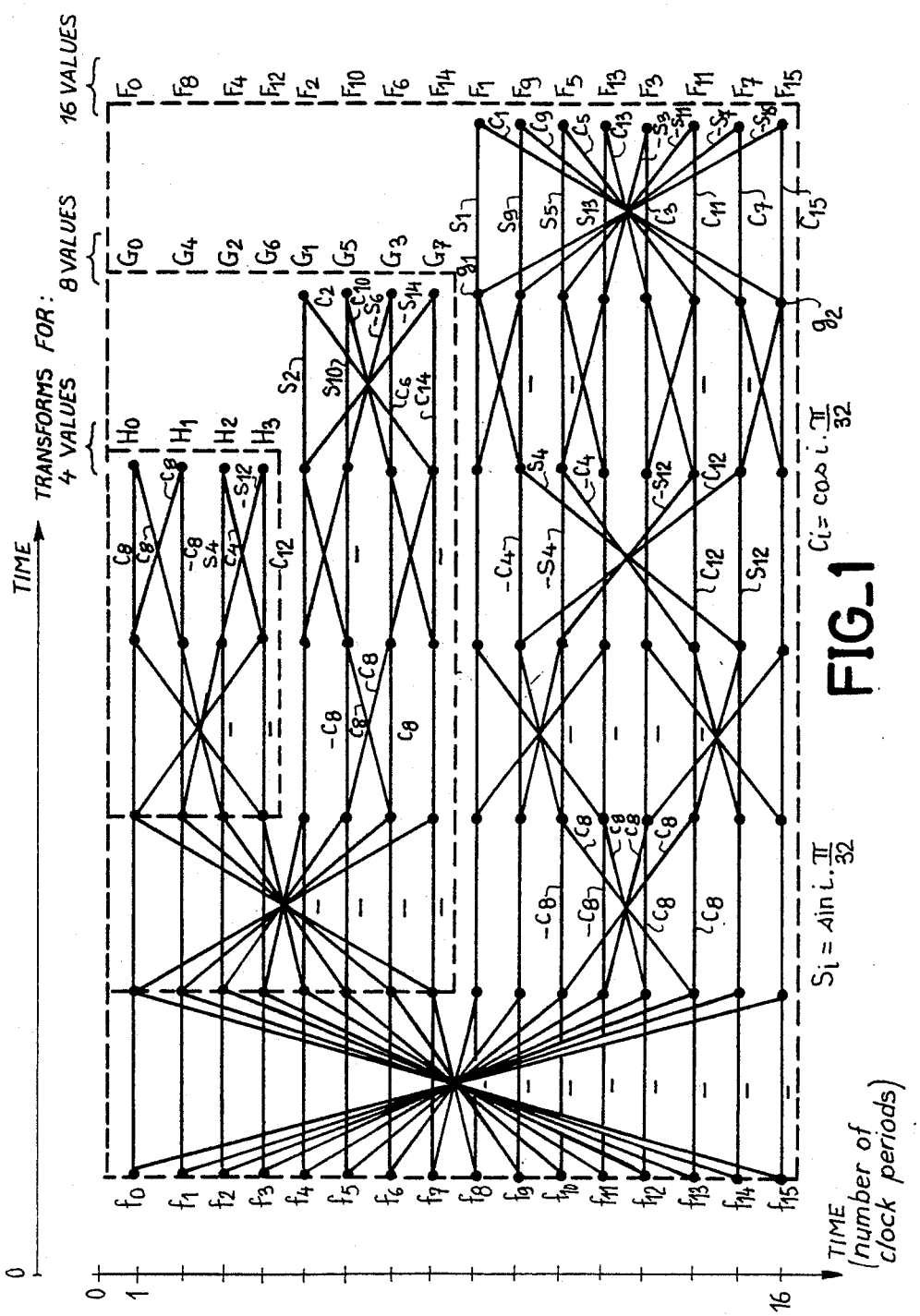

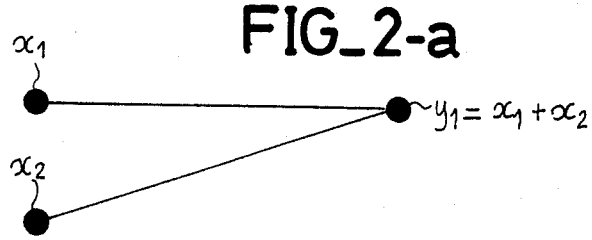
FIG_2-a
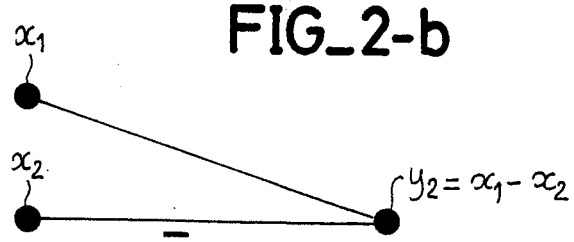
FIG_2-b
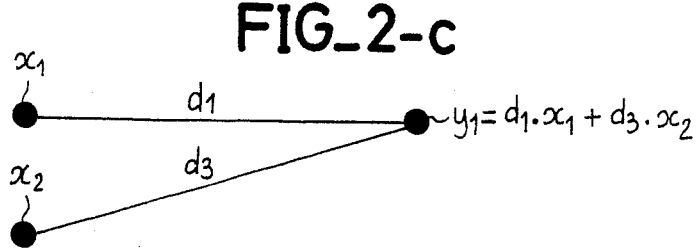
FIG_2-c
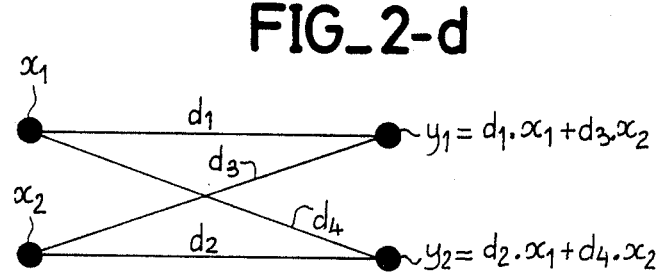
FIG_2-d

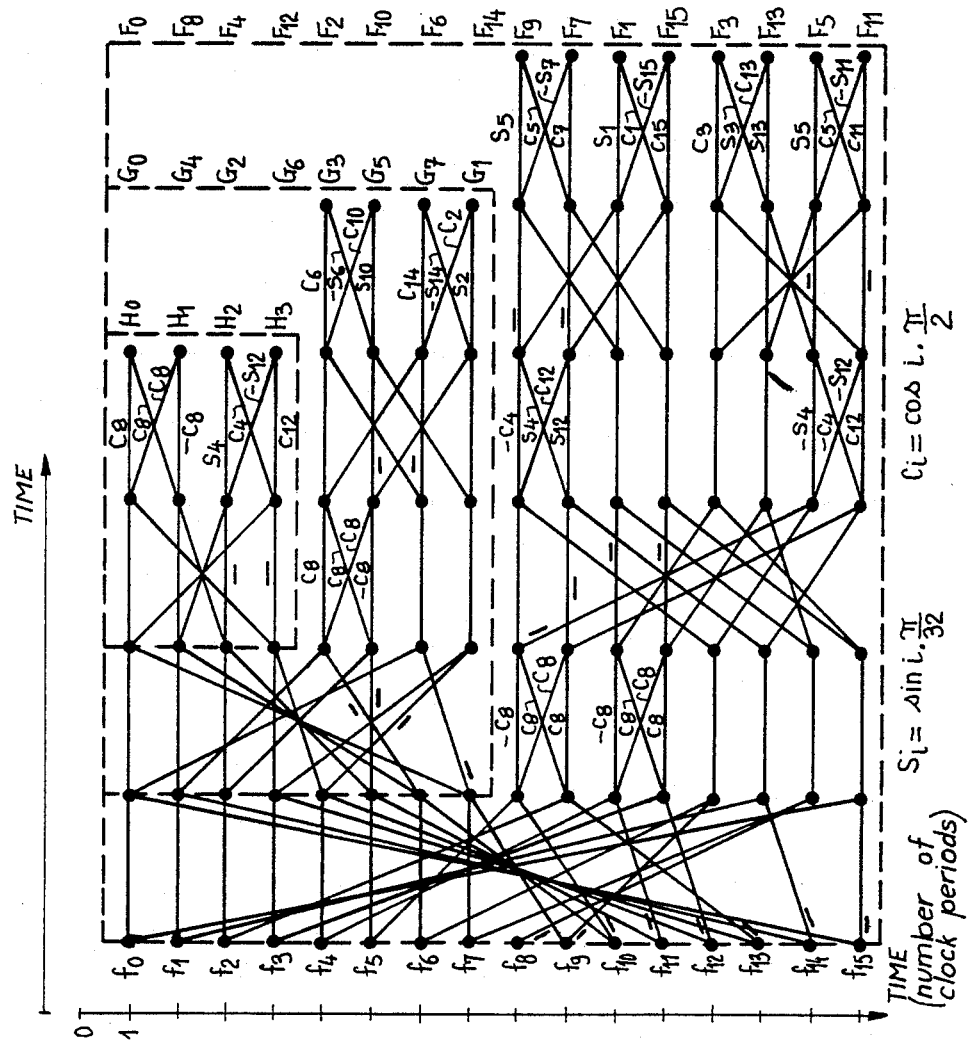
FIG_3

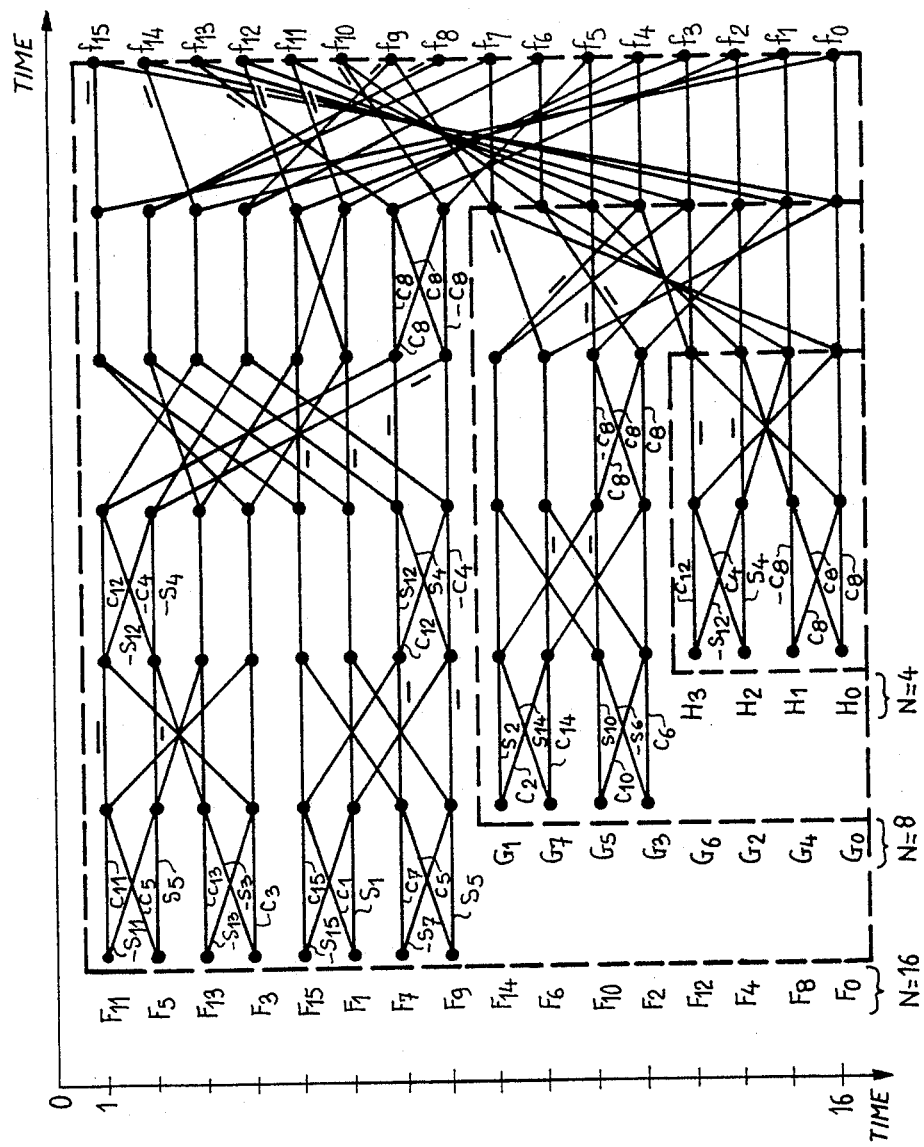
FIG_4

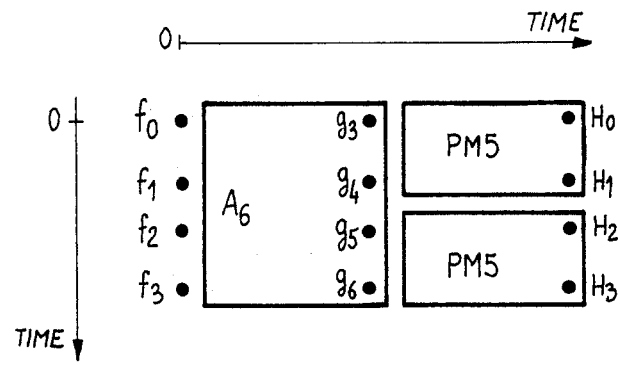
FIG_5
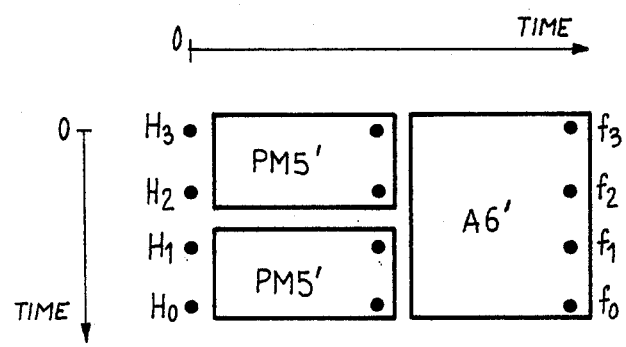
FIG_7
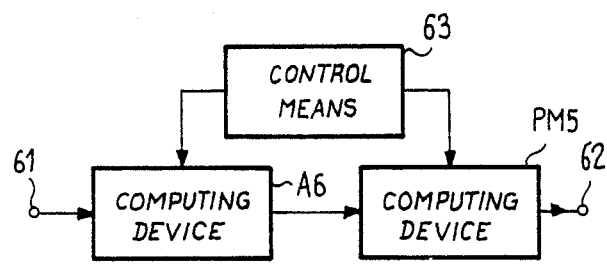
FIG_6
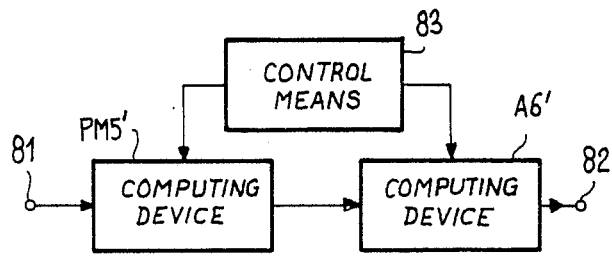
FIG_8

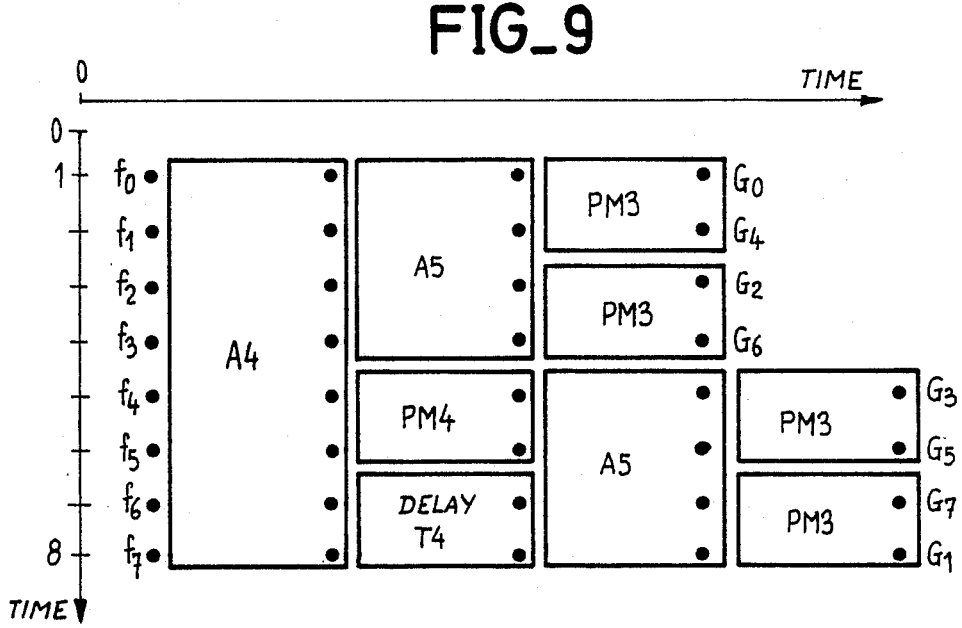
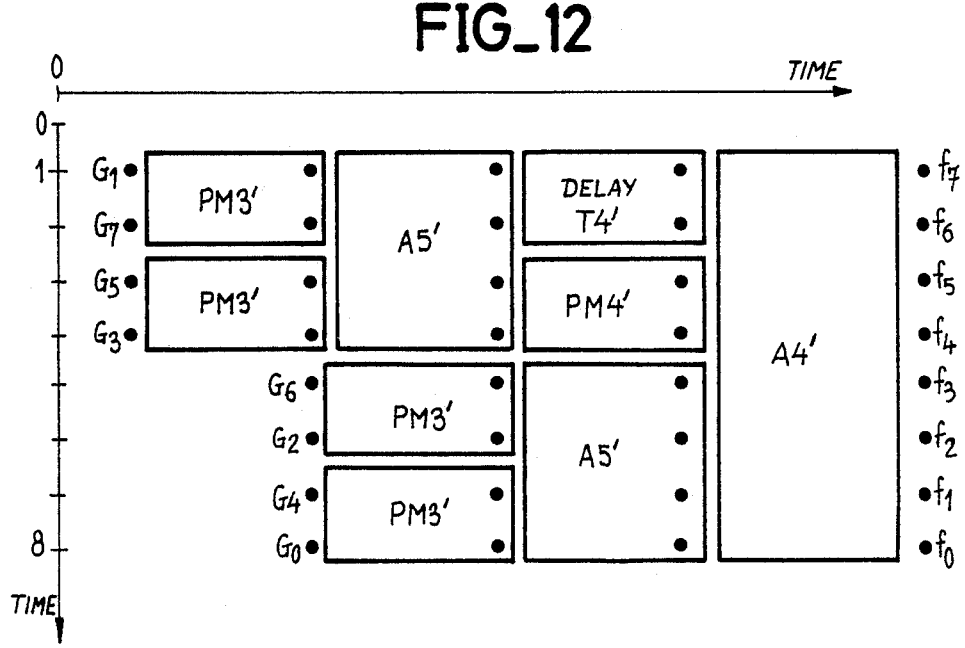

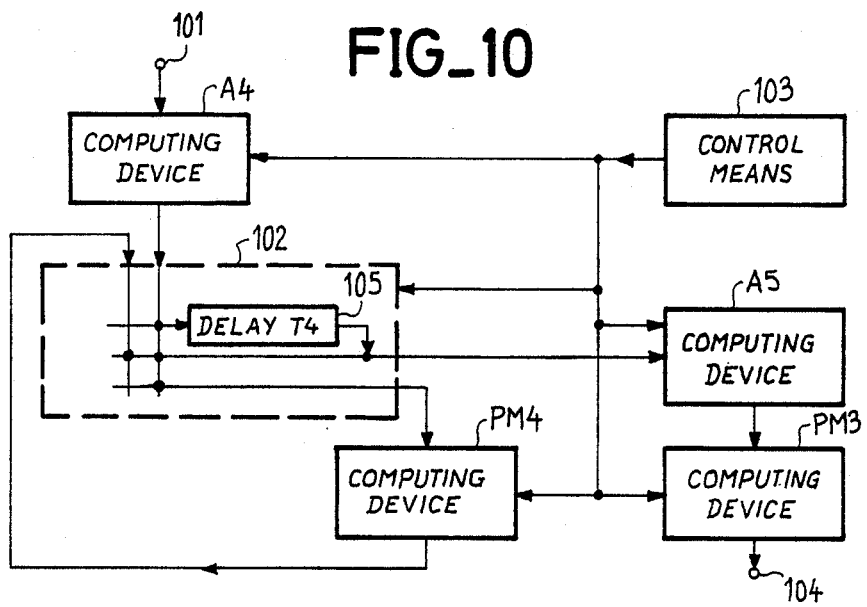
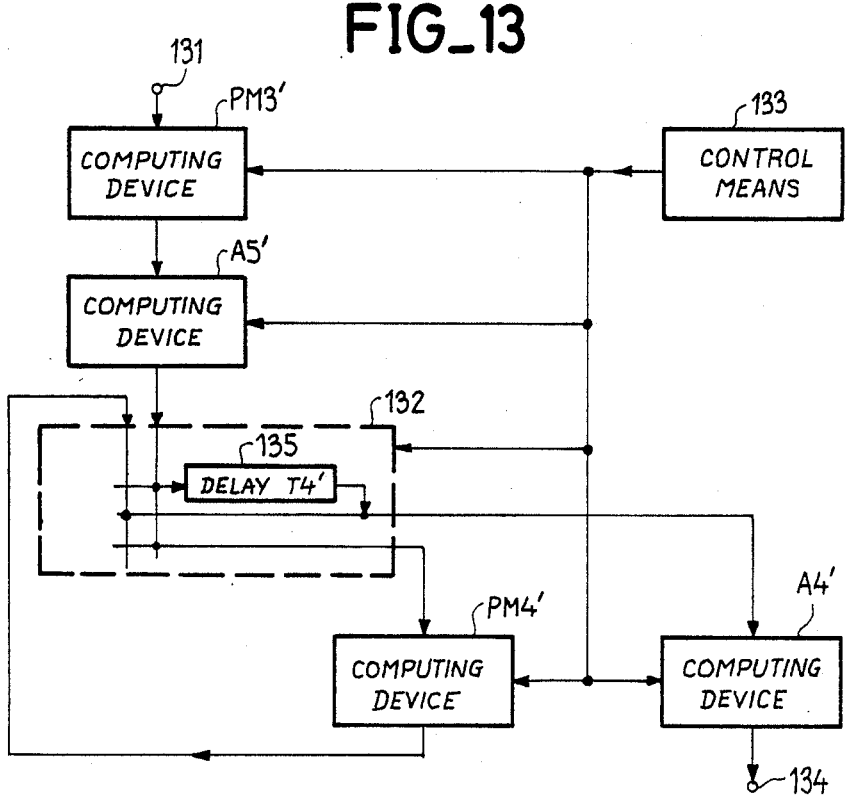

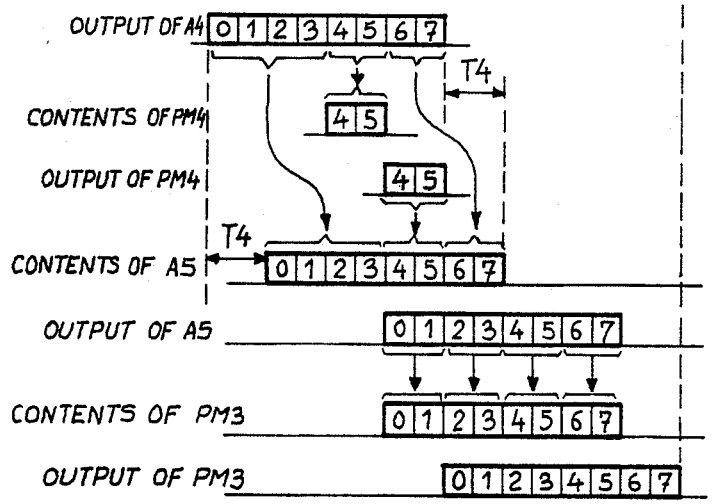
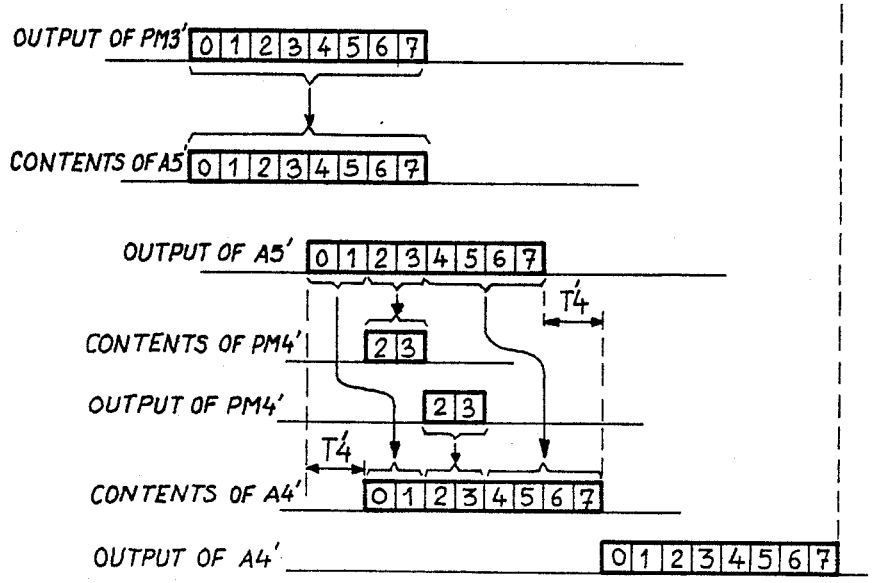

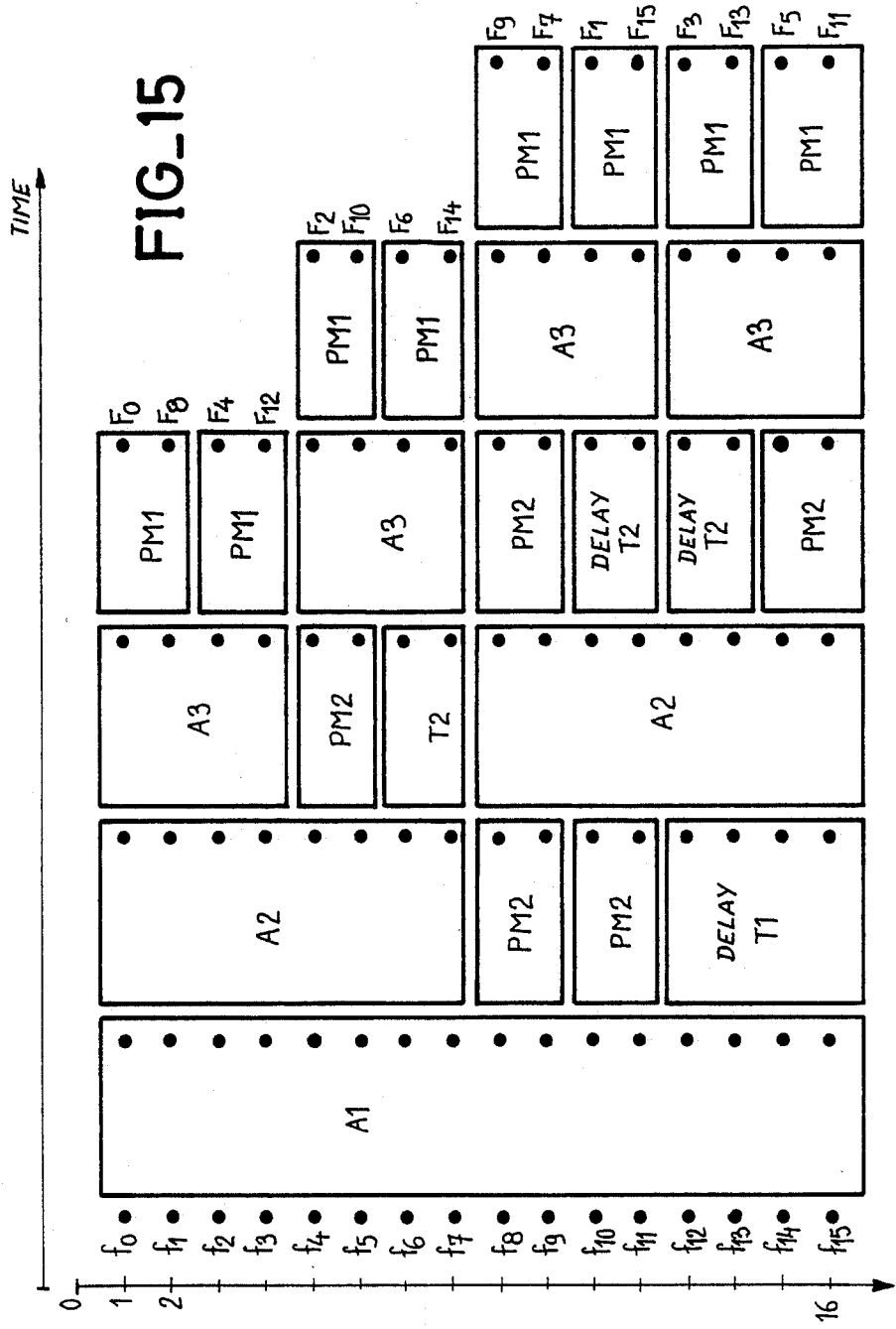

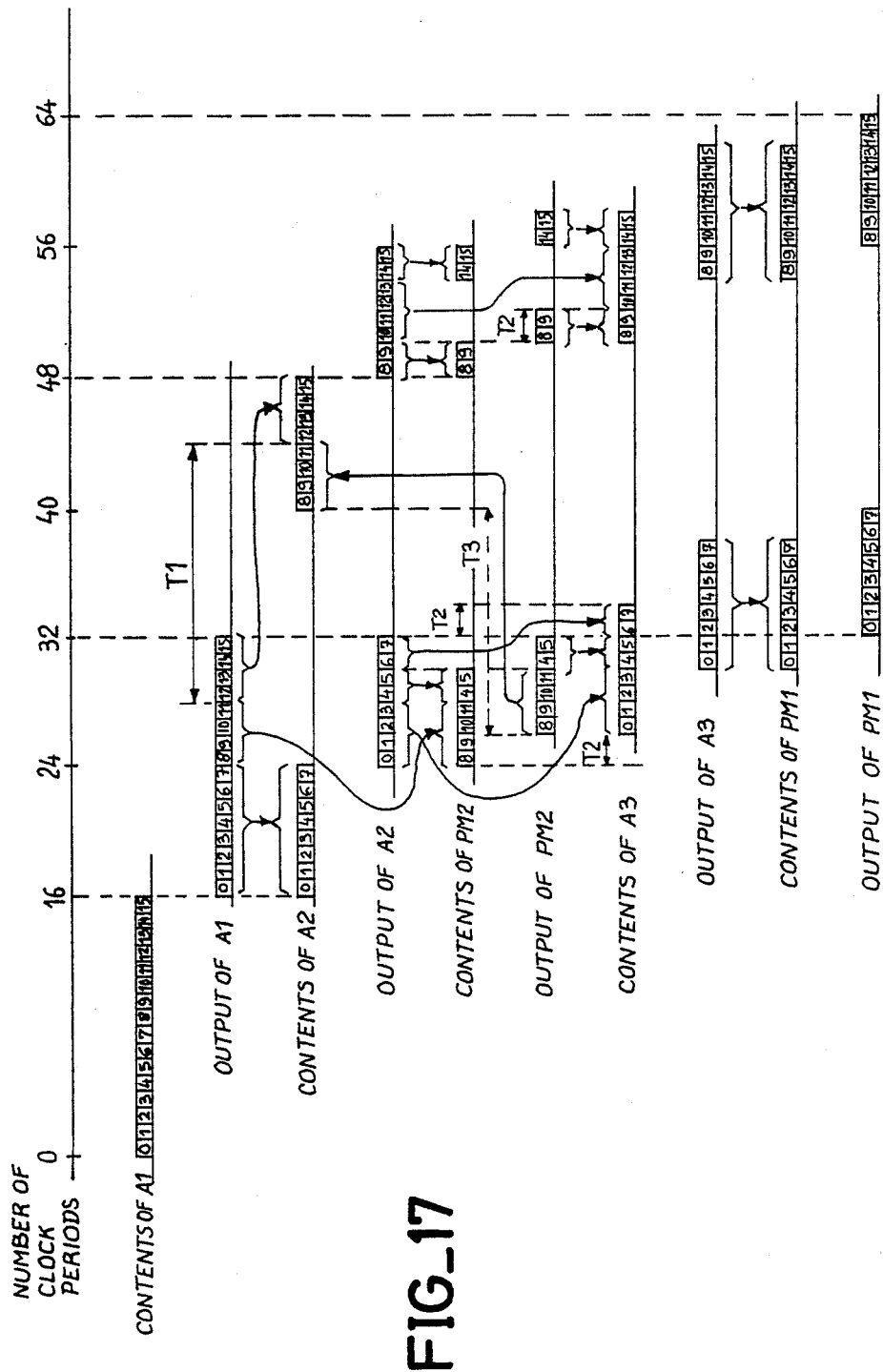
FIG_17

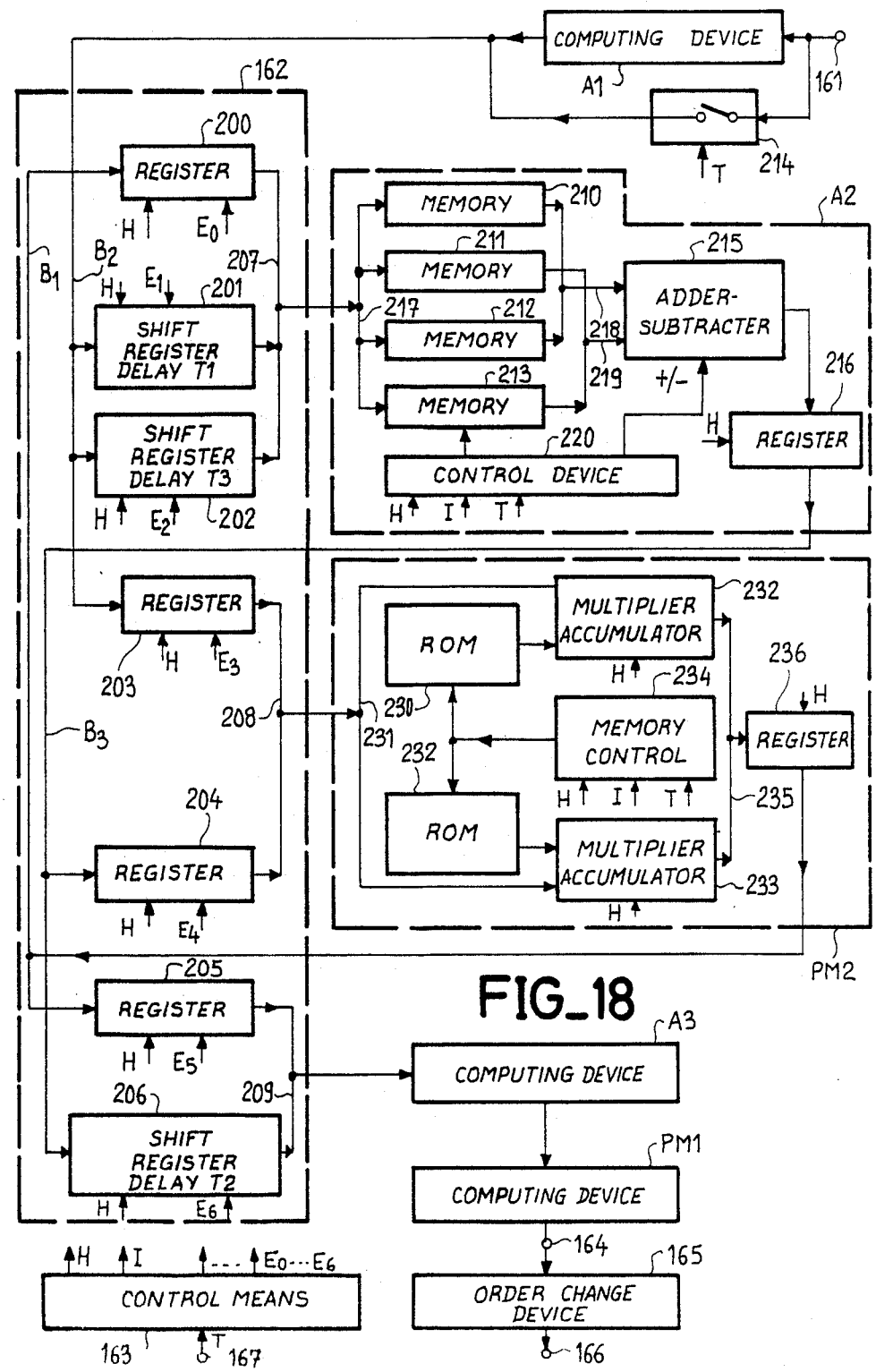
FIG_18

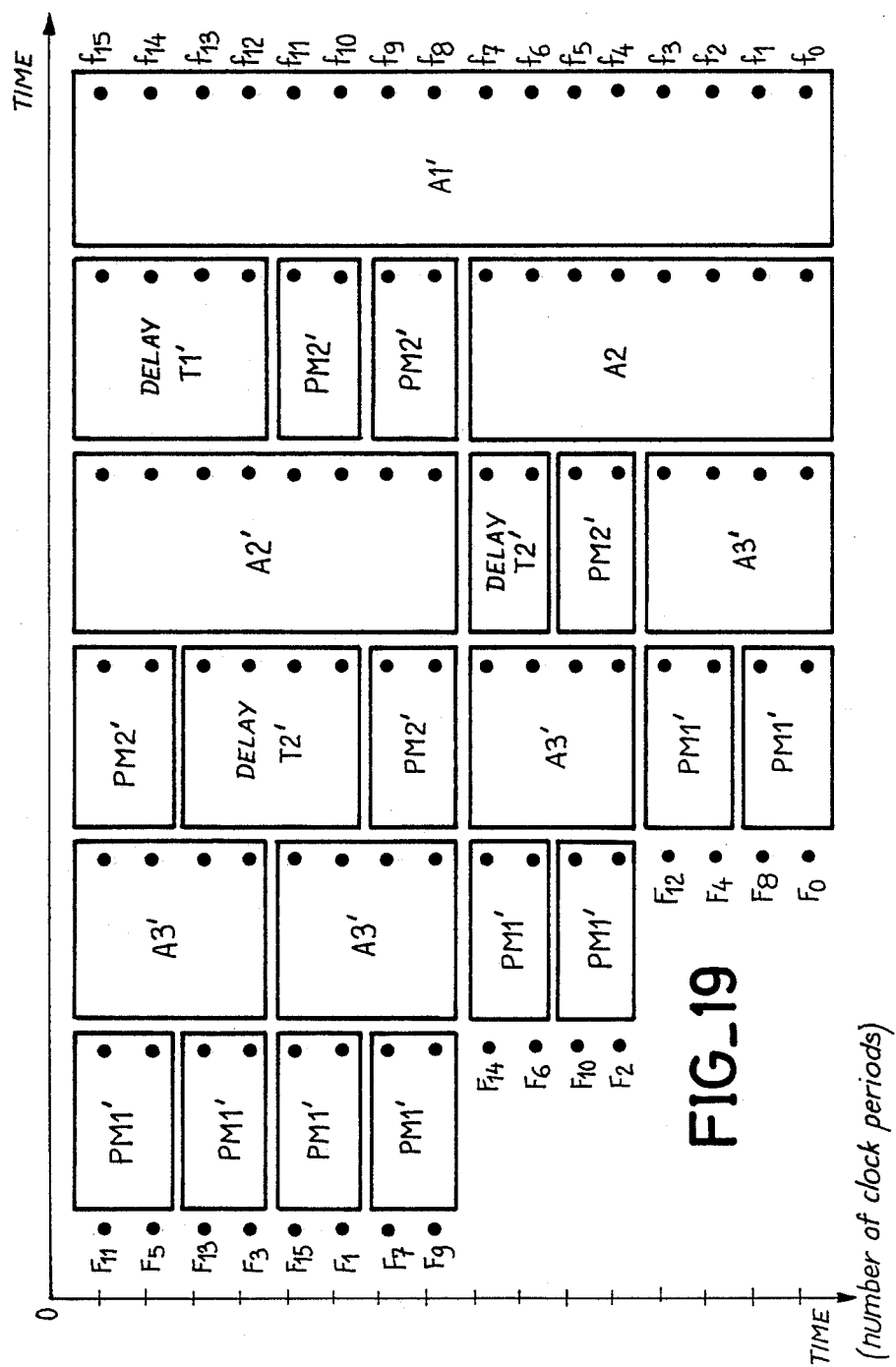
FIG_19

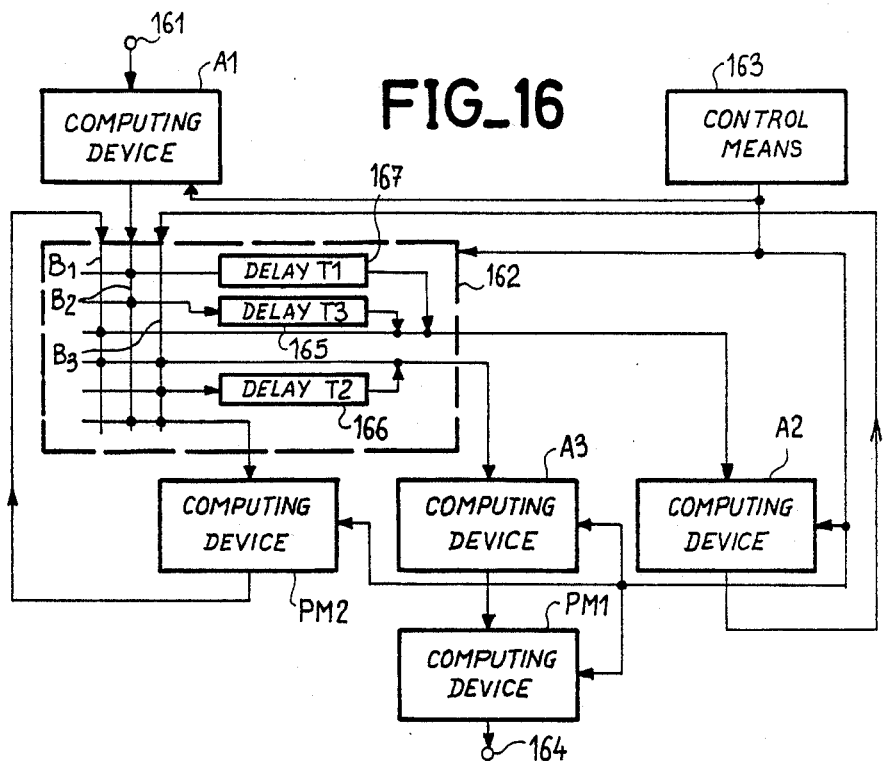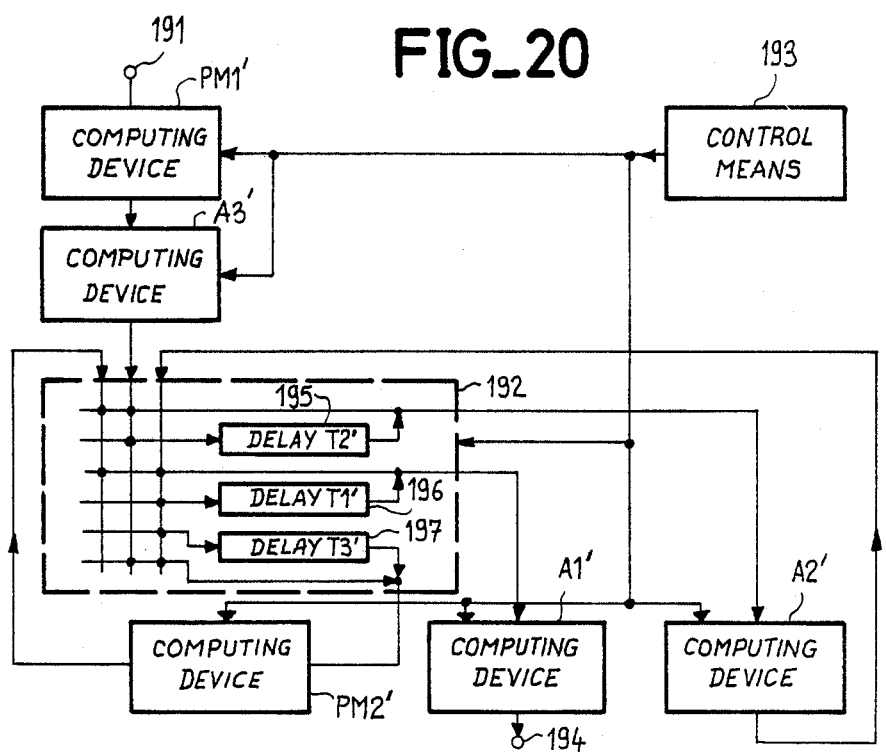

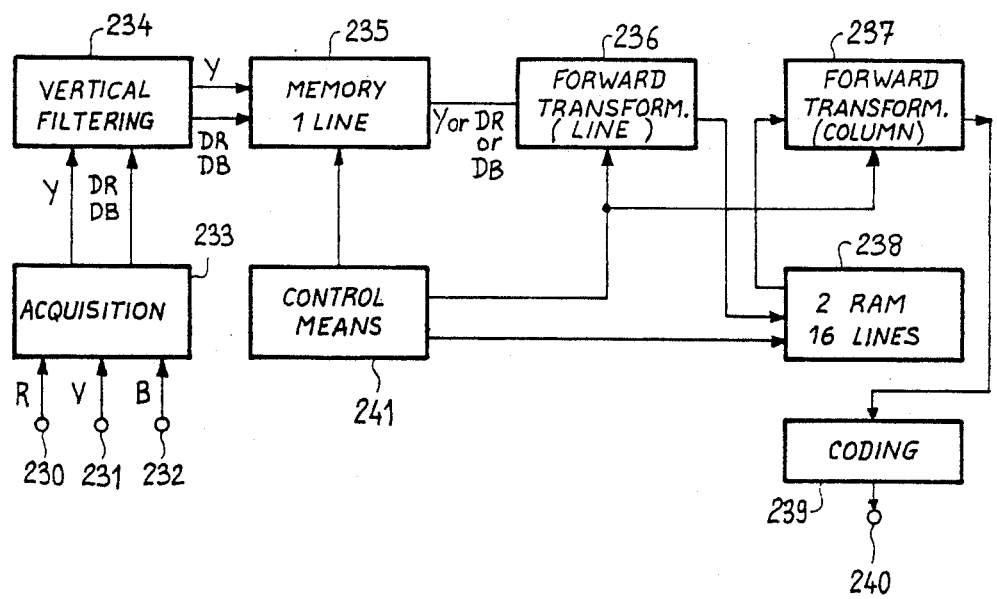
FIG_22
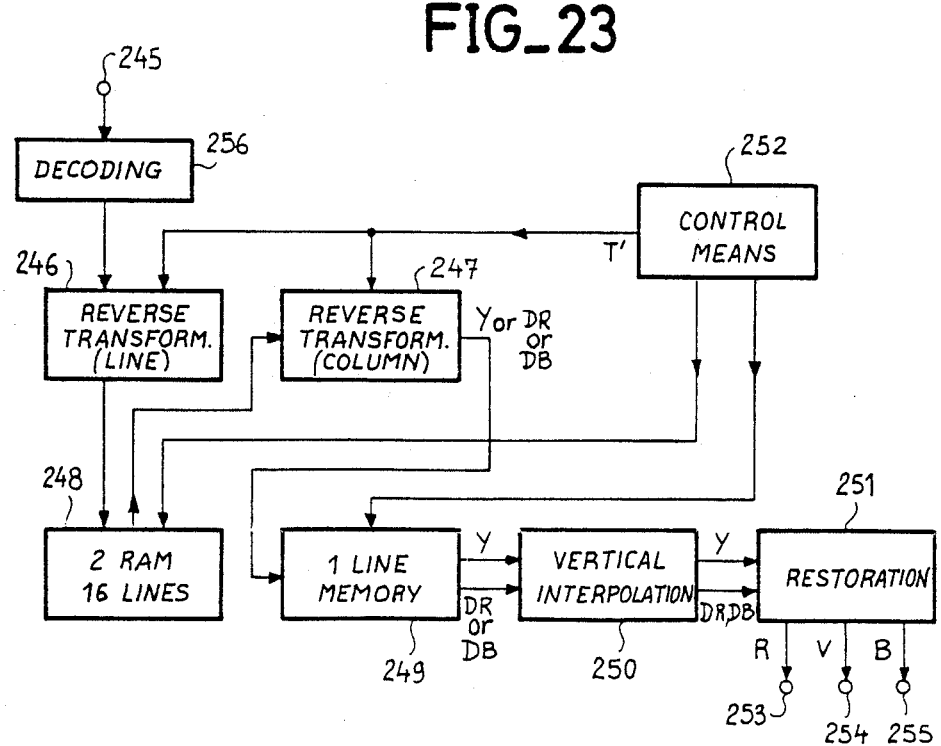
FIG_23

COSINE TRANSFORM COMPUTING DEVICES, AND IMAGE CODING DEVICES AND DECODING DEVICES COMPRISING SUCH COMPUTING DEVICES

BACKGROUND OF THE INVENTION

The invention relates to cosine transform computing devices, and more particularly to such devices which are used for image coding and decoding in order to reduce the amount of information representing these images.

Coding the values representative of the luminance and of the color of the points of an image is known using a transformation called a cosine transformation which, this transformation causes a matrix of N×N values, called transforms, to correspond to a matrix of N×N values, representing points of a portion of an image to be coded. This image is cut up into square portions each formed by a block of N×N points. Weighting the transformed values allows the amount of information representative of an image to be reduced. Decoding consists in applying a reverse weighting, then a reverse transformation, which causes a matrix of N×N reverse transformed values to correspond to a matrix of N×N forward transformed values. Like the coding, decoding is achieved by blocks of N×N image points. If the values representative of the points of a block are f(i, j) for i=O to N−1 and j=O to N−1, the values of the forward transforms are given by the following formulae:

$$F_b(u,v) = \frac{c(u) \cdot c(v)}{N^2} \cdot \sum_{i=0}^{N-1} \cdot \sum_{n=0}^{N-1} f(i,j) \cdot a_{iu} \cdot a_{jv} \quad (1)$$

for $u = 0$ to $N - 1$ and $v = 0$ to $N - 1$, with $c(u) = \frac{1}{\sqrt{2}}$ for $u = 0$ and $c(v) = \frac{1}{\sqrt{2}}$ for $v = 0$ $c(u) = 1$ for $u = 1, 2, \ldots, N - 1$ and $c(v) = 1$ for $v = 1, 2, \ldots, N - 1$ $a_{iu} = \cos \frac{(2i + 1) \cdot u \cdot \pi}{2N}$ and $a_{j,v} = \cos \frac{(2j + 1) \cdot v \cdot \pi}{2N}$ The reverse transformed values are supplied by the reverse cosine transformation by applying the following formulae:

$$f(i,j) = \sum_{u=0}^{N-1} \sum_{V=0}^{N-1} c(u) \cdot c(v) F_b(u,v) a_{iu} \cdot a_{jv} \quad (2)$$

This cosine transformation is a bidimensional transformation which may be broken down into two monodimensional cosine transformations and the bidimensional transforms may be computed using two monodimensional transform computing devices connected in cascade. The monodimensional cosine transformation is obtained in accordance with the following formula:

for $k = 0, 1, 2, \ldots, N - 1$ \quad (3)

$$F(k) = \frac{2}{N} c(k) \cdot \sum_{i=0}^{N-1} a_{ik} \cdot f(i)$$

with $c(k) = \frac{1}{\sqrt{2}}$ for $k = 0$ $c(k) = A$ for $k = 1, 2, \ldots, N - 1$ and $a_{ik} = \cos \frac{(2i + 1) \cdot k \cdot \pi}{2N}$ The reverse monodimensional cosine transformation is obtained by the following formulae:

for $i = 0$ to $N - 1$ \quad (4)

$$f(i) = \sum_{k=0}^{N-1} b_{ik} \cdot F(k)$$

with $b_{ik} = c(k) \cdot \cos \frac{(2i + 1) \cdot k \cdot \pi}{2N} = c(k) \cdot a_{ik}$ Coding of an image by cosine transformation followed by weighting allows the amount of information to be transmitted to be greatly reduced, but has the drawback of requiring very numerous calculations. Such a large amount of calculation is costly in equipment and in computing time. It makes it very difficult to apply cosine transformation to the coding and decoding of a succession of video images at the usual frequency, fifty frames per second in the European standards.

Integrated circuits exist on the market for performing addition or subtraction operations, or a multiplication and accumulation operations. Their performances in speed and accuracy are, however, limited. A known method for providing a large amount of calculations at high speed consists in multiplying the number of computing devices and in working them in parallel. Such transform computing devices thus formed would then be too costly to be usable in wide commercial distribution applications.

SUMMARY OF THE INVENTION

The aim of the invention is to provide, for a low cost, a device for computing monodimensional cosine transforms and a device for computing monodimensional reverse cosine transforms, then to provide coding and decoding devices applying the bidimensional cosine transformation to video images complying with the standards of conventional television.

The invention provides more particularly monodimensional cosine transform computing devices formed of a small number of elementary computing devices which are of two types and which may be constructed from integrated circuits available commercially. The number of integrated circuits is reduced to a minimum but allows the forward or reverse transformation function to be achieved at a rate equal to the analysis rate of the image points in a conventional television standard.

The invention also provides devices for image coding and decoding by bi-dimensional cosine transformation, comprising devices thus formed.

In accordance with the invention, a device for computing forward monodimensional cosine transforms by blocks of N values, N being equal to 8 or 16, receiving at an input a succession of values to be transformed, with a constant period TO, and delivering at an output a succession of forward transforms, with the same period TO, comprises, a plurality of computing devices of a first type, each having an operand input receiving successions of M values $x_i$, for $i=0$ to $M-1$, M being an integer less than or equal to N, having a control input and an output delivering successions of M values $y_j$ for $j=0$ to $M-1$ with a period TO and such that:

$$y_j = x_i + x_k \text{ or } y_j = x_i - x_k$$

with i and k between O and $M-1$, as a function of a succession of control signals applied to the control input the input of the transform computing device being connected to the operand input of a computing device of the first type;

a plurality of computing devices of a second type, each having an operand input receiving successions formed of successive values $x_1$, $x_2$, having a control input and having an output delivering a succession of values $z = d_1 \cdot x_1 + d_2 \cdot x_2$, where $d_1$ and $d_2$ are two real predetermined numbers and functions of a succession of control signals applied to the control input; the output of the transform computing device being connected to the output of a computing device of the second type;

a coupling device having a plurality of inputs coupled respectively to the outputs of the computing device, a plurality of outputs coupled respectively to the operand inputs of the computing devices and having a control input receiving a succession of control signals:

control means delivering at the control inputs of the computing devices and of the coupling device, successions of control signals having a period N.TO, such that the coupling device connects all the computing devices in series between the input and the output of the transform computing devices, in a variable order such that each value of the succession supplied by the output of the transform computing device is equal to:

$$F(k) = \frac{2}{N} \cdot c(k) \sum_{i=0}^{N-1} a_{ik} \cdot f(i) \text{ for } k = 0 \text{ to } N - 1$$

$$\text{where } c(k) = \frac{1}{\sqrt{2}} \text{ for } k = 0$$

$$c(k) = 1 \text{ for } k = 1, 2, \ldots, N - 1$$

$$a_{ik} = \cos \frac{(2i + 1) \cdot k \cdot \pi}{2}$$

and where f(i), for $i=0$ to $N-1$ is a block of N values to be transformed.

BRIEF DESCRIPTION OF THE DRAWINGS

FIG. 1 shows a forward monodimensional cosine transform computing diagram for blocks of 4 values, 8 values or 16 values, in accordance with a known method;

FIGS. 2a, 2b, 2c and 2d show elementary operations which form the diagram of FIG. 1;

FIG. 3 shows another diagram for computing foward monodimensional cosine transforms for blocks of four values, eight values or sixteen values;

FIG. 4 shows a computing diagram derived from that of FIG. 3 and showing the computation of reverse monodimensional cosine transforms for blocks of fourt values, eight values and sixteen values;

FIGS. 5, 9 and 15 show portions of the diagram of FIG. 3 and designate computing devices to which are attributed the computations shown in FIG. 4; FIGS. 5, 9 and 15 corresponding to the cosine transformation of four, eight and sixteen values respectively;

FIGS. 7, 12 and 19 show portions of the diagram of FIG. 4 and designate computing devices to which are attributed the different computations to be performed for the monodimensional reverse transformation of four, eight and sixteen transforms respectively;

FIGS. 6 and 8 show the block diagrams of one embodiment of a monodimensional forward cosine transform computing device and a reverse monodimensional cosine transform computing device, for blocks of four values;

FIGS. 10 and 13 show the block diagrams of one embodiment of amonodimensional forward cosine transform computing device in accordance with the invention and one embodiment of a reverse monodimensional cosine transform computing device in accordance with the invention for blocks of eight values:

FIGS. 11 and 14 show timing diagrams illustrating the operation of the embodiments of FIGS. 10 and 13:

FIGS. 16 and 20 show the block diagrams of one embodiment of a monodimensional forward cosine transform computing device of the invention and one embodiment of a reverse monodimensional cosine transform computing device of the invention for frames of 16 values:

FIGS. 17 and 21 show timing diagrams illustrating the operation of the embodiments of FIGS. 16 and 20;

FIG. 18 shows a more detailed block diagram of the embodiment of FIG. 16: and

FIGS. 22 and 23 show the block diagram of one embodiment of an image coding device of the invention and one embodiment of an image decoding device of the invention.

DETAILED DESCRIPTION OF THE PREFERRED EMBODIMENT

Figure 21:
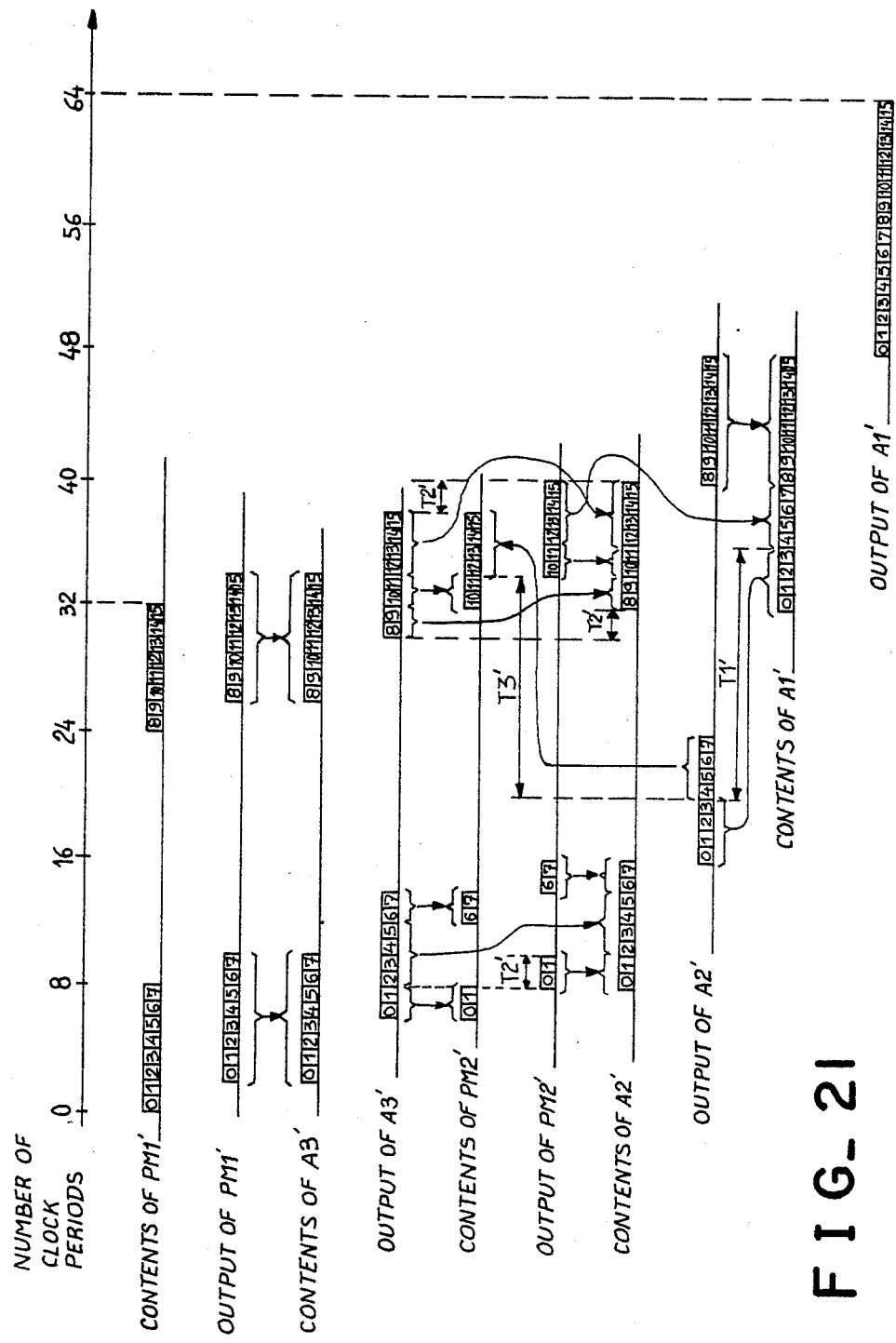

FIG. 1 shows in a very condensed way a succession of calculations for computing the forward monodimensional cosine transforms of a block of four, or eight or sixteen values, in a reduced time. This diagram is given by R. A. DURYEA in the article entitled "performance of a source/channel encoded imagery transmission system" Thesis AFIT/GE/EE79D-12 Air force Institute of Technology OHIO December 1979. It is derived from the above mentioned formula (3) using the mathematical relationships existing between the coefficients $a_{ik}$.

The points of the first column on the left represent the values to be transformed $f_0, \ldots f_{15}$, corresponding to a monodimensional block of 16 image points. The points at the extreme right of the diagram represent the values of the transforms obtained at the end of the calculation. The values $F_0, \ldots F_{15}$ are the transforms of the block of sixteen values: $f_0, \ldots f_{15}$. The values $G_0, \ldots, G_7$ are the transforms of a block of eight values: $f_0, \ldots f_7$. The values $H_0, \ldots H_3$ are the transforms of a block of four values: $f_0, \ldots f_4$. The calculations corresponding to the transformation of a block of four, eight and sixteen values are defined respectively by three rectangles, shown with broken lines, which partially overlap each other. The points which do not represent the values to be transformed or the transformed values represent the intermediate values and each line between two points represents an elementary mathematical operation.

The values forming each block to be transformed are not available simultaneously, but sequentially in the order $f_0, \ldots, f_{15}$ with a constant period TO equal to the time for analysing each image point. For compressing a succession of television images it is necessary for the transformed values to be calculated with a period equal to the period TO for analysing the image points. It should be noted that this diagram represents a progression of calculations from left to right from the values to be transformed towards the transformed values and, from top to bottom, from the first values of a block to the last values of this block. However, the same calculations may be performed in the order $f_{15}$ to $f_0$, that is to say by reading the diagram from bottom to top.

When the calculations are performed in the order $f_0, \ldots f_{15}$, the transformed values are obtained in the order: $F_0, F_8, F_4, F_{12}, F_2, F_{10}, F_6, F_{14}, F_1, F_9, F_5, F_{13}, F_3, F_{11}, F_7, F_{15}$, for the transformation of a block of sixteen values. The transforms of eight values are obtained in the order: $G_0, G_4, G_2, G_6, G_1, G_5, G_3, G_7$. The transforms of a block of four values are obtained in the order: $H_0, H_1, H_2, H_3$.

Two lines converging towards a point represent a simple addition. For example, the first points situated in the second column on the left represents the sum value of $f_0$ and $f_{15}$. When a first line converges with a second line having the sign "—" the resultant value is equal to the difference between the two values situated at the origin of these lines. For example, the last point shown in the second column on the left represents $f_0 - f_{15}$.

When two lines converge towards a point and are accompanied respectively by coefficients $d_1$ and $d_3$ and therefore a value $x_1$ and a value $x_2$ respectively, the value represented by the point is equal to the sum $d_1.x_1 + d_3.x_2$. For example, the transformed value $F_1$, which is represented by a point at the top of the last column on the right, is equal to the sum $S_1.g_1 + c_1.g_2$, $g_1$ and $g_2$ being the values represented respectively by the fifth and the thirteenth point in the second column on the right. In this diagram, the coefficients are represented in a simplified way by symbols of the form $c_i$ and $s_i$ which are equal to:

$$c_i = \cos i \cdot \frac{\pi}{32}, \quad s_i = \sin i \cdot \frac{\pi}{32} \text{ with } i = 1, \ldots, 15.$$

The coefficient of normalisation $c(O) = 1\sqrt{2}$, which is in the previously mentioned transformation formulae, does not appear in the computing diagram.

The calculation of monodimensional cosine transforms by blocks of four, eight or sixteen values, in accordance with the procedure shown by the diagram of FIG. 1, may be entirely achieved by means of computing devices providing addition, subtraction, multiplication and storage. It should also be noted that the computation of the transforms $F_1, F_9, F_5, \ldots F_{15}$ pass through five columns of intermediate values which depend on the original values $f_0, \ldots f_{15}$ by a whole succession of calculations. The calculation of each transformed value is then spread out over a number of periods TO very much greater than sixteen, and so it is necessary to calculate the transforms of several blocks in parallel so as to obtain at the output of the computing device, transforms at the same rate as that with which the original values are applied to the input of a transform computing device.

In order to minimize the number of elementary computing devices used, each elementary computing device must be used in several steps of the calculation shown in FIG. 1. Two types of elementary computing devices are used in the transform computing device of the invention: computing devices performing the addition or subtraction function, and computing devices performing the multiplication and accumulation function. These devices may be formed largely by means of adder-subtractor integrated circuits of the type F 283 manufactured by FAIRCHILD and by means of multiplier-accumulator integrated circuits AM 29510 manufactured by AMD.

FIGS. 2a, b, c, d show, using the same conventions as FIG. 1, the elementary operation which may be performed respectively by the first and second type of elementary computing devices forming the devices of the invention. A clock of period TO synchronizes these devices.

FIG. 2a represents the addition. The device delivers a value $y_1 = x_1 + x_2$ from two values $x_1$ and $x_2$ applied successively to an operand input with a time interval equal to one or more clock periods. FIG. 2b represents the subtraction operation, the device delivering a value $y_2 = x_1 - x_2$, $x_1$ and $x_2$ being two values applied successively to the operand input with a time interval equal to one or more clock periods.

In practice, the elementary computing devices of the first type are formed mainly by an adder-subtractor and a RAM capable of storing a predetermined number of operand values, for example four. In this case, during the first four clock periods, the device stores four operand values: $x_1, x_2, x_3, x_4$, then during the next four periods it delivers successively four result values.

For example:
$y_1 = x_1 + x_3$
$y_2 = x_4 - x_1$
$y_3 = x_3 - x_2$
$y_4 = x_2 - x_4$ Storage means that the values $x_1$ and $x_4$, for example, are available for calculating $y_2 = x_4 - x_1$. The different functions of these computing devices are controlled, for example, by counting the number of clock periods from an initialization signal. If N is the number of values per block, each elementary computing device operates with a period N.TO.

FIG. 2c shows the multiplication-accumulation operation which may be performed by an integrated circuit multiplier-accumulator. A multiplier-accumulator comprises the operand input receiving successively a value $x_1$, then a value $x_2$ with an interval equal to a clock period and comprises an output delivering a value $y_1 = d_1.x_1 + d_3.x_2$, the coefficients $d_1$ and $d_3$ predetermined in the device and being selected by a logic signal applied to a control input of the device. For example, the values of the coefficients may be selected by counting the number of clock periods from an initialization signal. It should be noted that this calculation requires two clock periods in addition to the two periods required for entering $x_1$ and $x_2$ for it comprises first of all two multiplications, then an addition of the results of these multiplications.

In practice, the elementary computing devices of the second type are formed from two accumulator-multipliers connected in parallel and allowing two result values to be obtained during each pair of clock periods.

FIG. 2d shows the operations performed by a pair of multiplier-accumulators thus formed. The operand input of this elementary computing device of the second type receives successively a value $x_1$ a value $x_2$, and an output of the computing device delivers successively a value $y_1 = d_1.x_1 + d_3.x_2$ then a value $y_2 = d_2.x_1 + d_4.x_2$. If $x_1$ is applied to the input of the device during a first clock period and $x_2$ during a second clock period, the value $y_1$ is available at the output of the device during the third clock period and $y_2$ is available during the fourth clock period.

Naturally, if $x_1$ and $x_2$ are not available during two successive clock periods, the time for calculating $y_1$ and $y_2$ is extended by the time separating the availability of the values $x_1$ and $x_2$. This case frequently occurs in the calculation shown in FIG. 1. For example, the last step in calculating the transform $F_1$ is a calculation of the form $g_1.s_1+g_2.c_1$, in which $g_1$ and $g_2$ are two values separated in time by eight clock periods for these values are separated by eight lines in the diagram of FIG. 1. During this time interval, the multiplier-accumulator is waiting, or at least it must store the first value which it receives: $g_1$, carry out other calculations so as not to lose its time, then receive the second value: $g_2$, and finally determine the result $F_1$.

Such waiting for the values of the operands also exists for the computing devices of the first type. For example, in FIG. 1, the first point of this second column on the left represents the sum value of $f_0$ and $f_{15}$, which can only be calculated after applying $f_0$ then $f_{15}$ to the input of the computing device, that is to say after waiting for the value $f_{15}$ for fifteen clock periods.

As was mentioned above, the storage function is provided in the first type of computing device. On the contrary, this function is not provided in the second type of computing device. Such distribution of functions between the two types of computing device is justified by the fact that the multiplication-accumulation operations appearing in this computing diagram only relate to pairs of operands whereas the operations of the addition-subtraction type relate to four, eight or sixteen values. The operators of the first type necessarily comprise memories for storing these numerous values whereas it is not indispensable for the operators of the second type, provided that the diagram of FIG. 1 is modified so that the two values forming each pair of operands of the devices of the second type are only separated by one clock period.

The diagram shown in FIG. 3 is derived from that of FIG. 1 for this purpose. The absence of memories at the input of the devices of the second type forms a simplification thereof and a simplification of the means for controlling them.

Two types of elementary computing devices having thus been defined, which will form the forward and reverse transform computing devices, the diagram of calculations shown in FIG. 1 must then be adapted so as to be able to use these two types of computing devices and attribute the different calculation steps to a certain number of devices of these two types, so as to use a minimum number of such computing devices.

The order in which the intermediate values of the calculation are available may be modified provided that the mathematical relations are respected which relate each value to the adjacent values in time, that is to say adjacent in the diagram of FIG. 1. Intuitively, that comes down to moving the points of the diagram as if they were tied to each other by elastic threads. Furthermore, some fixed delay devices may be added for delaying intermediated values. A fixed delay may be obtained simply by means of a shift register.

FIG. 3 shows one computing diagram example comprising the same calculations and the same intermediate values as a diagram of FIG. 1 but in which the timing order of such calculations is modified so that the computing devices of the second type receive, with an interval equal to a clock period, the two operand values required for each of the calculations which they carry out. The first four lines of the diagram are not modified for the operation effected by the devices of the second type in these first four lines are situated solely in the last column on the right and do not raise any problems. In FIG. 1, the operation situated in the first three columns on the left, in so far as the first four lines are concerned, only comprise additions-subtractions for which there are no particular conditions concerning the order of the operand values.

Let us then consider the fifth, sixth, seventh and eighth lines of the diagram of FIG. 1. It is apparent that computing devices of the second type must be used for carrying out the caculations in the third column from the left and in the last column on the right. In the third column, the two operand values are on two consecutive lines and so they raise no problem.

On the other hand, in the last column on the right, the operand values for calculating $G_1$ and $G_7$ are situated on the fifth and eighth line and so are separated by three clock periods. While overcoming this problem, another problem must not be created in the third column, so the computing lines supplying the values $G_5$ and $G_3$ must be left adjacent. As is shown in FIG. 3, the computing lines leading to values $G_1$ and $G_7$ may be made adjacent while keeping the adjacency of the computing lines leading to values $G_3$ and $G_5$. The transforms obtained for blocks of eight values are then in the order $G_0.G_4,G_2,G_6,G_3,G_5,G_7,G_1$. The points situated on the fifth, sixth, seventh and eighth lines in the second column of points from the left are not moved.

Let us now consider the last eight lines of the diagram of FIG. 1. Multiplication-accumulation operations are present in the second, fourth and last column from the left. In the second column, it is apparent that the computing lines leading to values $F_{13}$ and $F_3$ must remain adjacent, but on the other hand the computing lines leading to values $F_5$ and $F_{11}$ must be made adjacent. In the fourth column, it is apparent that the computing lines leading to $F_5$ and $F_{11}$ must be made adjacent, and the computing lines leading to $F_9$ and $F_7$ must be made adjacent. In the sixth column, it is apparent that the computing lines leading to $F_1$ and $F_{15}$ must be made adjacent, the computing lines leading to $F_9$ and $F_7$ to be made adjacent, the computing lines leading to $F_5$ and $F_{11}$ to be made adjacent and the computing lines leading to $F_{13}$ and $F_3$ to be left adjacent.

Summing up these conditions, the computing lines leading to $F_{13}$ and $F_3$ must be left adjacent and the computing lines leading to $F_9$ and $F_7$, the computing lines leading to $F_1$ and $F_{15}$, and the computing lines leading to $F_5$ and $F_{11}$ must be made adjacent. This is what has been shown in the diagram of FIG. 3. All the intermediate values have been displaced, only the values to be transformed $f_8,f_9,\ldots,f_{15}$ having remained in their original order.

It should be noted that while respecting this same criteria for modifying the diagram of FIG. 1, it is possible to obtain diagrams different from that of FIG. 3.

From the diagram of FIG. 3 the minimum number of elementary computing devices may be determined for performing the cosine transformation of a block of four values, or a block of eight values, or a block of sixteen values. The four values to be transformed $f_0,f_1,f_2,f_3$ are represented by the first four points of the third column of points from the left. For a block of four values, it is necessary to carry out four operations of the addition-subtraction type relating to four operand values and it is necessary to carry out two pairs of operations of the multiplication-accumulation type. These multiplication-accumulation operations relate to two pairs of operands which are available successively. Furthermore, it is possible to enter a pair of operands in a pair of multipliers-accumulators during the two clock periods during which this pair of multipliers-accumulators delivers two successive results determined from a preceding operand pair. Consequently, with a single elementary computing device of the first type, the multiplication-accumulation operations may be performed required for the forward cosine transformation of a block of four values.

For the forward cosine transformation of a block of eight values, the values to be transformed $f_0, \ldots, f_7$, are represented by the first eight points of the second column of points from the left. It is necessary first of all to calculate eight intermediate values by eight operations of the addition-subtraction type relating to two values taken from the eight values to be transformed. Furthermore, it is necessary to carry out two sets of operations of the addition-subtraction type providing four intermediate values calculated from four successive operand values. During the time of four clock periods, an elementary computing device of the first type may simultaneously store successively four operand values and deliver successively four values of results calculated from a quadruplet of operand values previously stored. During the eight clock periodscorresponding to the time assigned to the calculation of the transforms of a block of eight values, the same computing device of the first type may perform these two sets of operations.

Finally, it is apparent from the diagram of FIG. 3 that it is necessary to perform five pairs of operations of the mutiplication-accumulation type. Dufing the time of two clock periods, a multiplier-accumulator pair may store two operand values and simultaneously deliver two successive results. So, during the time of eight clock periods assigned to the calculation of the transforms of a block of eight values, the same elementary computing device of a second type may calculate four pairs of results from four pairs of operands. In the case considered there are five pairs of results to be calculated, the minimum number of elementary computing devices of the second type is therefore equal to two and one of these two devices may not be used full time.

For calculating the cosine transforms of a block of sixteen values, it is necessary to carry out sixteen operations of the addition-subtraction type each relating to two values taken from the sixteen values to be transformed. For a time of sixteen clock periods, it is possible to store sixteen operand values and to deliver simultaneously at an output sixteen result values successively. So a first elementary computing device of the first type for calculating a result from two operands taken from sixteen successive values, is required and is sufficient for effecting these sixteen operations and it is occupied full time since the time assigned for transformation of a block of sixteen values is equal to sixteen periods T0.

In FIG. 3, in the upper half of the second column from the left and in the lower half of the third column from the left it is necessary to carry out eight operations of the addition-subtraction type delivering eight successive results calculated from two operands taken from eight successive values. A second elementary computing device of the first type may perform successively these two sets of operations and it will then be occupied full time.

In the third column from the left and on the first four lines, in the fourth column from the left of the fifth to eighth lines, and in the last column on the right of the ninth to twelfth lines and of the fourteenth to eighteenth lines, there are four sets of four operations of the type for adding-subtracting two operands taken from four values. Each of these two sets of operations requires four clock periods. A third elementary computing device may then perform these four sets of operations during the time assigned to the calculation of the transforms of a block of sixteen values, and this elementary computing device will then be occupied full time.

The unit for calculating the transforms of a block of sixteen values requires three sets of operations of the multiplication-accumulation type giving two results for a computing time of two block periods. Since an elementary computing device of a second type can only deliver eight pairs of results during the time of sixteen clock periods assigned to the calculation of the transform of sixteen values, the minimum number of computing devices of the second type is then equal to two. But there is at least one of them which will not be employed full time, since two devices of the second type may deliver up to sixteen pairs of results during sixteen clock periods.

The calculations required for restoring the original values $f_0 \ldots f_{15}$ from the transformed values may be represented by the same diagram as that of FIG. 1 but carrying out the calculations in the reverse order, that is to say from right to left, by reversing the horizontal time axis. The order of calculations along the vertical axis may be chosen from top to bottom or from bottom to top, without discrimination. In the example considered, the vertical time axis is also reversed. Each block of forward transformed values is presented in the order $F_{11}, F_5, F_{13}, F_3, F_{15}, F_1, F_7, F_9, F_{14}, F_6, F_{10}, F_2, F_{12}, F_4, F_8, F_0$, at the input of the device. The diagram derived from FIG. 3 for reverse transformation is shown in FIG. 4. The minimum number of elementary computing devices required may be derived from the diagram of FIG. 4, and it is identical to that derived from the diagram of FIG. 3 for the forward transformation.

In what follows a device for computing forward cosine transforms and a device for computing forward cosine transforms and a device for computing reverse cosine transforms will be described successively for monodimensional blocks of four values, eight values, and sixteen values. These devices carry out calculations in accordance with the diagram of FIG. 3 for the forward transformation and with the diagram of FIG. 4 for reverse transformation.

FIG. 5 shows a fraction of the diagram of FIG. 3, which is defined with a broken line in FIG. 3 and which corresponds to the calculations of the forward transformation for a block of four values $f_0, f_1, f_2, f_3$ the connections between the points have not been shown for the sake of clarity. The rectangles shown, A6 and PM5, define the calculations attributed to a computing device A6 of the first type and to a computing device pM5 of the second type.

As is clear from FIG. 3 the calculation of the transforms for a block of four values is very simple: the computing device A6 receives successively at its operand input four values $f_0, f_1, f_2, f_3$ during the first four clock periods. During the fifth, sixth, seventh and eighth clock periods the output of device A6 delivers four intermediate value $g_3, g_4, g_5, g_6$. During the fourth and fifth periods, $g_3$ and $g_4$ are applied successively to an operand input of the device PM5. During the seventh and eighth periods the device PM5 delivers successively the values $H_0$ and $H_1$ and receives at its operand input $g_5$ and $g_6$ success sively. During the ninth and tenth periods, device PM5 delivers $H_2$ and $H_3$ successively. The device PM5 is then available for receiving successively two other intermediate values supplied by the output of device A6. The same computing device PM5 is therefore used twice during the calculation of the transforms of a block.

The total time for calculating four transforms is ten clock periods. For determining the transforms at the same rate as that at which the original values are applied to the input of the device, it is necessary to begin the computation of the transforms of the next two blocks in device A6 while the computation of the transforms of the current block is taking place in device PM5. Thus three blocks of four values are applied successively to the operand input of device A5 during a time of twelve periods. With a delay of six periods, the output of device A5 delivers twelve transforms during the time of twelve periods.

FIG. 6 shows the block diagram of one example of a device for computing monodimensional cosine transforms by blocks of four values. This device comprises an input terminal 64 receiving successively the values to be transformed. Computing device A6 has an operand input connected to terminal 61 and an output permanently connected to an input of the computing device PM5. An output of the computing device PM5 is connected to an output terminal 62 of the transform computing device, delivering successively a succession of transformed values.

Control means 63 are connected to a control input of device PM5 and to a control input of device A6 for delivering thereto the clock signal of period T0 and an initialization signal. Devices A6 and PM5 operate cyclically with a period equal to four clock periods. The construction of computing devices of the first type and of the second type will be described in greater detail further on.

FIG. 7 shows a fraction of FIG. 4 showing the computations to be performed for the monodimensional reverse cosine transformation per block of four values, and rectangles represent the attribution of the calculations to a computing device A6' which is of the first type and a device PM5' which is of the second type.

During a first and second clock period the device PM5' receives forward transforms $H_3$ and $H_2$. During the third and fourth period it delivers two first intermediate values. During this first and this fourth clock period the same computing device PM5' receives successively two other forward transforms $H_1$ and $H_0$. During the fifth and sixth clock periods it delivers a third and a fourth intermediate values. After a delay of four clock periods, the computing device A6' has successively received at its operand input four intermediate values and may successively calculate the four reverse transform values: $f_3, f_2, f_1, f_0$ and deliver them successively at its output.

The calculation of four reverse transform values lasts ten clock periods. As for forward transformation, it is possible to apply three blocks of four successive values to the operand input of the device, during a time of twelve periods, then to obtain twelve reverse transform values at the output of device A6' with a delay of ten periods and a time of twelve periods.

FIG. 8 shows the block diagram of one embodiment of a device for calculating monodimensional reverse cosine transforms by blocks of four values, in accordance with the invention. In this embodiment an input terminal 81 receives a succession of forward transforms and applies them to an operand input of the computing device PM5'. An output of this latter is permanently connected to an operand input of the computing device A6' and an output of this latter is connected to an output terminal 82 of the cosine transform computing device and delivers a succession of reverse transform values.

Control means 83 are connected to a control input of device PM5' and to a control input of device A6' for delivering thereto the clock signal of period T0 and an initialization signal. Device A6' and pM5' operate cyclically with a period equal to four clock periods. They may be formed in a similar way to that of the devices of the first and of the second type which will be described further on.

In the very simple case of forward or reverse transformation by blocks of four values it is not necessary to provide switching for reusing the computing device PM5 or pM5'

For the forward or reverse transformation of blocks of eight or sixteen values, switching is required for reusing the elementary computing devices. Such switching must connect the elementary computing devices in series between the input and the output of the transform computing device, in a variable order corresponding to the order of the calculations shown in FIG. 3, for the forward transformation or corresponding to the order of calculation shown in FIG. 4 for reverse transformation, so that each value of the succession delivered at the output of the transform computing device is conformable with formula (3) or formula (4) respectively The number of computing devices required for forming a transform computing device and the complexity of the coupling means providing the switching are due to the way in which each computing step is attributed to one of the elementary computing devices. Such attribution must then be made while complying with the following rules.

determine the minimum, so optimum, number of elementary computing devices required, then attribute the computing steps to these devices so that they are all occupied full time, except possibly one of each type;

attribute the first computing step to the same elementary computing device, for all the values of each block, so that the input of the transform computing device is permanently connected to the input of a single elementary computing device;

attribute the last computing step to the same elementary computing device, for all the transform values corresponding to a block, so that the output of the transform computing device is permanently connected to the output of a single elementary computing device.

The transform computing devices of the invention put these three rules into practice.

FIG. 9 shows a part of the diagram of FIG. 3, corresponding to the calculation of the transforms by blocks of eight values, which part is surrounded by a broken line in FIG. 3 and which is shown in FIG. 9 without the connections between the points so as to simplify the Figure. The rectangles define the calculations attributed to different elementary computing devices: A4, A5, PM3, PM4.

In FIG. 9, the first column on the left corresponds to addition and subtraction operations which are entrusted to a computing device A4, of the first type, receiving eight values to be transformed, $f_0, \ldots f_7$, during eight clock periods and outputting successively eight intermediate values. The first four intermediate values are applied to an input of a computing device A5 which is of the first type, the fifth and sixth values are applied to an input of the computing device PM4, of the second type. The seventh and eighth intermediate values are applied to an input of the same computing device A5 with a delay T4 equal to two clock periods.

The delay T4 allows the delivery, at the input of A5, of the seventh and eighth intermediate values to be synchronized with the delivery, at the input of A5 by the computing device PM4, of the fifth and sixth intermediate values. Thus, these four intermediate values are applied successively to the input of A5 within four clock periods. Device A5 is used a first time and a second time for carrying out two series of four calculations relating to four values and delivering four values during a time of four clock periods. Thus, it calculates eight values during a time of eight clock periods assigned to the transformation of a block of eight values, it is therefore occupied full time. It is necessary, in the practical construction, to provide switchings since the values processed by A5 are delivered at one time by A4 and at another time by PM4.

The intermediate values calculated by the computing device A5 are used in calculations of the multiplication-accumulation type which deliver successively the transform values $G_0, G_4, G_2, G_6, G_3, G_5, G_7, G_1$. These intermediate values are used in successive pairs in a computing device of the second type PM3 which is used successively four times. Each time for a time equal to two clock periods. During the time of eight clock periods corresponding to eight values to be transformed, device PM3 calculates eight values, it is therefore occupied full time. The intermediate values used in the calculations by device PM3 are always delivered by device A5, so the connection between device A5 and device PM3 is a fixed connection. This distribution of the calculations between PM3 and PM4 is the most suitable since it avoids switching the input of PM3.

FIG. 10 shows the block diagram of one embodiment of a device for calculating monodimensional cosine transforms by blocks of eight values, in accordance with the invention. This embodiment comprises: an input terminal 101, receiving a succession of values to be transformed; an output terminal 104 delivering a succession of transforms; the computing devices 14, 15, PM3, pM4; a coupling device 102; and control means 103.

The input terminal 101 is connected to an operand input of the computing device A4. An output of device A4 is connected to a first input of the coupling device 102. A second input of the coupling device 102 is connected to an output of the computing device PM4. A first and a second output of the coupling device 102 are coupled respectively to an operand input of the computing device A5 and to an operand input of the computing device PM4. An output of the computing device A5 is connected to an operand input of the computing device PM3. An output of the computing device PM3 is connected to the output terminal 104. The control means 103 have outputs connected respectively to control inputs of each computing device A3, A4, PM3, PM4 and to a control input of the coupling device 102.

The control means 103 control each of the computing devices A4, A5, PM3, PM4 by delivering thereto an initialization signal and a clock signal of period T0. They control the coupling device 102 for connecting the output of the computing device A4 at one time to the input of device A5 and at another time to the input of device PM4 and for connecting the input of device A5 at one time to the output of device A4 and at another time to the output of device PM4 As was mentioned above, the computing devices A5 and PM3 are connected in series in a fixed way.

Device 102 has a switching function ahd a delay function. The switching function is symbolized in FIG. 10 by à switching matrix formed of two vertical conductors connected respectively to the two inputs of device 102 and three horizontal conductors. Two horizontal conductors are connected directly to the two outputs of device 102 and a third horizontal conductor is connected to the first output by a device 105 providing a delay T4. The variable connections formed by device 102 are symbolized by black dots at the intersections of the vertical conductors and the horizontal conductors.

FIG. 11 shows a timing diagram illustrating the operation of this embodiment for the transformation of a block of eight values, called current block, and with this diagram the operation of this embodiment for the preceding block and for the following block may be subsequently illustrated. During the first eight clock periods, device A4 receives successively at an input the eight values to be transformed. These values are referenced in FIG. 11 simply by an order number from 0 to 7. Device A4 calculates successively eight intermediate values which it delivers during the eight following periods. These intermediate values are referenced simply by their order number from 0 to 7.

During the time of the ninth to twelfth clock periods, the output of device A4 is connected to the input of device A5 by the coupling device 102 so as to load into device A5 the first four intermediate values, referenced 0, 1, 2, 3, by delaying them by a time T4 equal to two periods TO of the clock.

During the thirteenth and fourteenth periods, the intermediate values of rank 4 and 5 delivered by the output of A4 are transferred without delay into device PM4 through switching of the coupling device 102. During the fifteenth and sixteenth clock periods, the output of device PM4 delivers two new intermediate values, referenced four and five, which are then transferred without delay into device A5 through the coupling device 102 which has been switched in the meantime During the seventeenth and eighteenth periods, the intermediate values of ranks 6 and 7 delivered by the output of device A4 are also transferred into device A5 through the coupling device 102 in which they are delayed by a time T4 for resynchronizing them with the first six intermediate values already stored in device A5.

The values calculated by device A5 depend on four operand values. The output of device A5 is therefore able to deliver results after a delay of four periods, it delivers then four first values during the time from the fifteenth to the sixteenth period then it delivers four other values during the time from the nineteenth to the twenty-second clock period.

These results are transferred into the computing device PM3 where they are used in twos for calculating eight transforms, the first of which is available with a delay of two clock periods with respect to the input of the operands in device PM3. Finally, the calculations for transforming the eight values of the current block are spread out over 24 clock periods.

It is apparent that devices A4, A5 and PM3 are available during sixteen clock periods out of twenty four, which allows the current block to be processed in parallel with the preceding block and the following block. It should be noted that device PM4 has even more free time since it is only used during the time of two clock periods for processing a block.

From the timing diagram the connectionsmay be determined which are to be established during each clock period for processing the current block. These connections are described by the following table reading from left to right. For example:

A4 - PM4 indicates that the output of A4 is connected to the operand input of PM4.

pM4 - A5 indicates that the output of pM4 is connected directly to the operand in put of A5.

A4 - A5 (T4) indicates that the output of A4 is connected to the operand input of A5 through device 105 which provides the delay T4.

TABLE No 1

| number of clock periods | Connections to be formed for the transformation of the current block ($n = 8 =$ |
|---|---|
| 1 | |
| 2 | |
| 3 | |
| 4 | NONE |
| 5 | |
| 6 | |
| 7 | |
| 8 | |
| 9 | |
| 10 | A4 - A5(T4) |
| 11 | |
| 12 | |
| 13 | A4 - PM4 |
| 14 | |
| 15 | A4 - A5(T4) and PM4 - A5 and A5 - PM3 |
| 16 | |
| 17 | |
| 18 | |
| 19 | |
| 20 | A5 - PM3 |
| 21 | |
| 22 | |
| 23 | NONE |
| 24 | |

A timing diagram representing the operation of the diagram of FIG. 11 by a translation of eight clock periods. A timing diagram representing the operation of the block for the following block may be derived by a translation of eight clock periods in the other direction. It is also possible to write a table of connections to be formed for the transformation of the preceding block and a table of the connections to be formed for transformation of the following block, from table No. 1, by providing translations of eight clock periods. Furthermore, since the operation of each of the elementary computing devices has a period equal to the time assigned to the transformation of a block, namely eight clock periods, the recapitulation of the connections to be formed for the simultaneous transformation of the current block, of the preceding block and of the following block will give a table comprising the same connections for the time extending from the first to the eighth periods, for the time extending from the ninth to the sixteenth periods and for the time extending from the seventeenth to the twenty fourth-periods. The table recapitulating these connections may then be simplified by only considering the time extending from the first to the eighth period.

TABLE No 2

| number of clock periods (modulo 8) | Connections to be formed for transformation of the current block, of the following block and of the preceding block |
|---|---|
| 1 | |
| 2 | A4 - A5(T4) - PM3 |
| 3 | |
| 4 | |
| 5 | A4 - PM4 and A5 - PM3 |
| 6 | |
| 7 | A4 - A5(T4) and PM4 - A5 and A5 - PM3 |
| 8 | |

As could have been foreseen, the connection between the output of device A5 and the operand input of device PM3 is a permanent connection. The non permanent connections to be formed by the coupling device 102 are recapitulated in the following table:

TABLE No 3

| number of clock periods (modulo 8) | Non permanent connections to be formed for transformation of the current block, of the following block & of the preceding block, the connection A5 - PM3 being permanent. |
|---|---|
| 1 | |
| 2 | A4 - A5 (T4) |
| 3 | |
| 4 | |
| 5 | A4 - PM4 |
| 6 | |
| 7 | A4 - A5(T4) and PM4 - A5 |
| 8 | |

The computing devices A4, A5, PM4, PM3 and the coupling device 102 may be formed similarly to the way described further on for computing devices of the first type, of the second type and for coupling means. For some applications where it is necessary to restore the transform values in the order $F_0, \ldots F_7$, it is within the scope of a man skilled in the art to construct a device for changing the order of a block of eight values and to connect it to the output terminal 104 of the transform computing device.

Since there exist variants of the diagram of FIG. 3, there also exist variants of the diagram of FIG. 9, and consequently there exist variants of construction of the device shown in FIG. 10. Since these variants concern the order of carrying out the calculations, they correspond then to other tables of connections to be formed.

FIG. 12 shows a portion of the diagram of the calculations shown in FIG. 4 for determining reverse transform values $f_0, \ldots f_7$, from transforms $G_1, G_7, G_5, G_3, G_6, G_2, G_4, G_0$, presented in this order. The rectangles define the calculations which are attributed to each of the elementary computing devices. All the calculations may be carried out by means of two devices of the first type: A4' and A5', and two devices of the second type: PM3' and PM4'. In the first column on the left device PM3' performs a first then a second pair of multiplciation-accumulation operations. In the second column from the left the computing device A5' performs a first set of four operations of the type providing addition-subtraction of two operands taken from four values, then device PM3' performs a third and a fourth pair of multiplication-accumulation operations. In the third column from the left, two intermediate values are transmitted without modification but with a delay T4' equal to two clock periods, then the computing device PM4' performs a pair of multiplication-accumulation operations, and device A5' performs a second set of four operations of the addition-subtraction type. In the last column on the right, the computing device A4' performs eight operations of the type providing addition-subtraction of two operands taken from eight values.

FIG. 13 shows the block diagram of one embodiment of a device for calculating reverse cosine transforms by blocks of eight values, in accordance with the invention. An input terminal 131 receives a succession of values to be transformed and applies them to an operand input of the computing device PM3'. An output of device PM3' is connected permanently to an operand input of the computing device A5'. An output terminal 134 forms the output of the transform computing device and is connected to an output of the computing device A4'.

A coupling device 132 has two inputs connected respectively to an output of the computing device A5' and to an output of the computing device PM4' and has a first and second output connected respectively to an operand input of the computing device PM4' and to an operand input of the computing device A4'. Device 132 performs the switching and delay function. The functions are symbolized respectively by a switching matrix comprising two vertical conductors connected respectively to the two inputs of device 132 and three horizontal conductors. Two of the horizontal conductors are connected directly to the two outputs of device 132 and a third horizontal conductor is connected to the second output of device 132 through a device 135 providing a delay T4'. The variable switching provided by device 132 is symbolized by black dots at the intersections of the vertical and horizontal conductors. Control means 103 deliver an initialization signal and a clock signal of period TO to each of the computing devices PM3', PM4', A4', A5', and deliver control signals to the coupling device 132.

FIG. 14 is a timing diagram illustrating the operation of this embodiment. During eight clock periods the computing device PM3' receives and stores eight transform values which are referenced by their order numbers 0, ... ,7. From the third to the tenth clock periods the output of device PN3' delivers a series of eight intermediate values represented by their order numbers 0, ... 7, with a delay of two periods with respect to the input of the transform values in this device. As soon as they are available, these intermediate values are stored in device A5'. Device A5' stores the first four intermediate values delivered by the output of PN3' then delivers four result values at the same time as it stores four other intermediate values delivered by the output of PN3' during the time from the seventh to the tenth period. It delivers four other result values during the time from the eleventh to the fourteenth periods.

The first two values and the last four values delivered by the output of device A5' are transmitted and stored in device A4' by the coupling device 132 with a delay T4' equal to two clock periods. The third and fourth values, referenced 2 and 3, are transmitted without delay to the device PN4' by the coupling device 132 during the ninth and tenth periods. During the eleventh and twelfth periods the output of device PN4' delivers two result values which are transmitted without delay to the input of device A4' by the coupling device 132. As is apparent from the timing diagram of FIG. 14, the eight intermediate values applied to the input of device A4' are in an order corresponding to the input order of the transform values and the total time of occupation of device A4' for storing these eight values and processing them is exactly equal to eight clock periods. During the time from the seventeenth to the twentyfourth clock periods the output of device A4' delivers successively eight values which are the reverse transform values. The reverse transformation of a block of eight values extends then over twenty four clock periods. The following table shows the connections formed for the reverse transformation of a single block of eight values, called current block.

TABLE No 4

| number of clock periods | Connections to be formed for the reverse transformation of the current block (n = 8 =) |
|---|---|
| 1, 2 | NONE |
| 3, 4, 5, 6 | PM3' - A5' |
| 7, 8 | PM3' - A5' and A5' - A4'(T4') |
| 9, 10 | PM3' - A5' - PM4' |
| 11, 12 | A5' - A4'(T5') and PM4' - A4' |
| 13, 14 | A5' - A4'(T4') |
| 15, 16, 17, 18, 19, 20, 21, 22, 23, 24 | NONE |

In the timing diagram of FIG. 14, it is apparent that the elementary computing devices are free for a time at least equal to sixteen periods out of the twenty four periods of the total time for the transformation. It is then possible to perform simultaneoulsy the calculations required for the transformation of two other blocks of eight values. The timing diagrams corresponding to the following block, the current block and to the block preceding the current clock are derived from the timing diagram shown in FIG. 14 by simple translations corresponding to eight clock periods. Similarly, it would be possible to draw up two tables representing the connections to be formed for the reverse transformation of the following block and of the preceding block. The following table recapitulates all the connections to be formed for the simultaneous transformation of these three blocks, taking into account the period of operation of each computing device, which is equal to eight clock periods.

TABLE No 5

| number of clock periods (modulo 8) | Connections to be formed for the reverse transformation of the current block, of the following block, and of the preceding block (N = 8), simultaneously |
|---|---|
| 1, 2 | PM3' - A5' - PM4' |
| 3, 4 | PM3' - A5' - A4'(T4') and PM4' - A4' |
| 5, 6, 7, 8 | PM3' - A5' - AR'(T4') |

As for the forward transformation device, numerous variants of construction are possible for the reverse transformation device. The computing devices PM3', pM4', A4', A5', and the coupling device 132 may be formed similarly to the embodiments of the computing devices of the first type and of the second type and of the coupling devices which are described further on. Furthermore, it is within the scope of the man skilled in the art to construct an order change device for putting the values applied at the input of the device in the order $G_1, G_7, G_5, G_3, G_6, G_2, G_4, G_0$, if they are not available in this order.

The connection between the output of device PM3' and the operand input of device A5' is a permanent connection. The connections to be formed by the coupling device 132 are therefore limited to the connections shown in the table below:

TABLE No 6

| number of clock periods (modulo 8) | Non permanent connections to be formed for the reverse transformation of the current block, and the following block and of the preceding block (n = 8) |
|---|---|
| 1, 2 | A5' - PM4' |
| 3, 4 | A5' - A4'tT4') and PM4' - A4' |
| 5, 6, 7, 8 | A5' - A4'(T4') |

FIG. 15 shows a diagram derived from the computation diagram shown in FIG. 3, for the forward cosine transformation of a block of sixteen values. The connections between the points, which represent the mathematical relationships between the values, have not been shown, however rectangles define the operations which are attributed to elementary computing devices A1, A2, A3, PM1, PM2. The computing devices A1, A2, A3, are of the first type. The computing devices PM1 and PM2 are of the second type. Their number is equal to the minimum, so optimum, number for providing the set of calculations shown in FIG. 3. It remains to couple them so that they perform the calculation of the transforms at the rate 1/T0 with coupling means which are as simple as possible The calculations are attributed to elementary computation devices by applying the above defined rules.

In the first column on the left, device A1 performs successively sixteen operations of the type providing addition-subtraction of two operands from the sixteen values to be transformed $f_0, \ldots f_{15}$, then delivers sixteen intermediate values. The computing device A2 performs eight operations of the type providing addition-subtraction of two operands taken from the first eight intermediate values delivered by device A1, then device PN2 calculates four intermediate values in two pairs of operations of the multiplication-accumulation type on the two following pairs of intermediate values delivered by device A1. The last four intermediate values delivered by the output of A1 are transmitted without modification but with a delay T1.

In the third column from the left, the first four intermediate values calculated by device A2 are used by device A3 for determining four other intermediate values per four operations of the addition-subtraction type. Then device PM2 performs another pair of multiplication-accumulation operations on two other intermediate values delivered by device A2. The last two intermediate values delivered by device A2 are transmitted without modification but with a delay T2. THe four intermediate values calculated by device PM2 and the intermediate values transmitted with a delay T1 are used by device A2 for eight operations of the addition-subtraction type.

In the fourth column from the left, four intermediate values calculated by device A3 are used by device PM1 for performing two pairs of operations of the multiplication-accumulation type. Then two intermediate values calculated by device PM2 and two values transmitted with the delay T2 are used by device A3 for performing four operations of the addition-subtraction type. Two intermediate values calculated by device A2 are used by device PM2 for performing two operations of the multiplication-accumulation type. Four values determined by device A2 are transmitted without modification, with the delay T2. The last two intermediate values calculated by device A2 are used by device PM2 for performing two operations of the multiplication-accumulation type.

In the fifth column from the left, the device PM1 performs successively two pairs of operations of the multiplication-accumulation type from four intermediate values determined by device A3. Device A3 performs four operations of the addition-subtraction type on two intermediate values determined by the device PM2 and on two intermediate values delayed with the delay T2. Then device A3 again performs four operations of the addition-subtraction type on two other intermediate values delayed by the delay T2 and on two other intermediate values determined by the device PM2.

In the fifth column from the left, the device PM1 performs successively two pairs of operations of the multiplication-accumulation type from four intermediate values determined by the device A3. Device A3 performs four operations of the addition-subtraction type on two intermediate values determined by the device PM2 and on two intermediate values delayed by the delay T2. Then device A3 again performs four operations of the addition-subtraction type on two other intermediate values delayed by the delay T2 and on two other intermediate values determined by the device PM2.

In the last column on the right, the device PM1 performs successively four pairs of operations of the multiplication-accumulation type from eight values determined successively by device A3.

This way of attributing the computing operation to the elementary computing devices results in the computing device PM1 being occupied for the sixteen clock periods corresponding to the time attributed for processing a block of sixteen values, in other words device PM1 is occupied full time. The same goes for the computing device A1 which determines sixteen intermediate values, for the computing device A2 which determines twice eight intermediate values, and for the computing device A3 which determines four times four intermediate values. Only the computing device PM2 is not occupied full time for it performs five pairs of operations of the multiplication-accumulation type during a time of sixteen clock periods which would allow it to perform eight.

The distribution of the operations of the multiplication-accumulation type between devices PM1 and PM2 could be provided differently, but the one chosen here has the advantage that the operands received by device PM1 are always values determined by device A3, consequently there will always be a permanent connection between the output of A3 and the operand input of PM1. Furthermore, the input of the transform computing device is permanently connected to the input of device A1 and the output of the transform computing device is permanently connected to the output of device PM1. These permanent connections simplify the construction of the coupling means.

FIG. 16 shows the block diagram of one embodiment of a device for computing forward cosine transforms by blocks of sixteen values, in which the operations are attributed to elementary computing devices A1, A2, A3, pM1 and PM2, in accordance with the diagrams of FIG. 15. An input terminal 161 receives a succession of values to be transformed and applies them to an operand input of the computing device A1. An output terminal 164 forms the output terminal of the transform computing device and is connected to an output of the computing device PM1 determining a succession of transform values. A coupling device 162 has three inputs connected respectively to outputs of devices A1, PM2 and A2 and has a first, second and a third output connected respectively to operand inputs of devices A2, A3, PM2. An output of device A3 is connected to an operand input of the computing device PM1. Control means 163 are connected respectively to control inputs of devices A1, A2, A3, PM1, pM2 and of the coupling device 162.

The coupling device 162 comprises switching means symbolized by a matrix of three vertical conductors Pl; P2, P3 and six horizontal conductors, and three delay devices 165, 166 and 167 providing respectively delays T1, T2 and T3. The three vertical conductors $B_1, B_2, B_3$, of the matrix form respectively three inputs of device 162, connected respectively to outputs of the devices PM2, A1 and A2. Three horizontal conductors of the matrix form the three outputs of device 162. Three other horizontal conductors of the matrix are connected respectively to inputs of the delay devices 165, 166 and 167. An output of the delay device 165 and an output of delay device 167 are connected to the first output of the coupling device 162. An output of delay device 165 is connected to the second output of the coupling device 162.

FIG. 17 shows a timing diagram illustrating the operation of this embodiment during processing of a block of sixteen values called current block. With the same timing diagram the operation may be illustrated for the transformation of the blocks preceding and the blocks following the current block.

For the first sixteen clock periods the values to be transformed are stored successively in device A1. During the time from the seventeenth to the thirty-second period, device A1 delivers at its output successively sixteen intermediate values the first eight of which are transferred and stored in device A2, the following four of which are transferred and stored in device P2 and the last four of which are delayed by a delay T1 then transferred into device A2, through the coupling device 162.

During the time from the twenty-fifth to the thirty-second period of the clock signal, device A2 delivers at its output a succession of eight values calculated from the eight values previously received by this device A2. The first four values delivered by the output of A2, and which are referenced 0, . . . ,3, are transmitted by device 162, with a delay T2, equal to two periods of the clock signal, to device A3 where they are stored. The fifth and sixth values, referenced 4 and 5 , delivered by the output of A2 are transmitted directly by the coupling device 162 to device PM2. The seventh and eighth values, referenced 6 and 7, delivered by the output of A2 are transmitted with a delay T2 by the coupling device 162 to device A3, during the thirty-third and thirty.fourth periods of the clock signal.

During the time from the 27th to the 32nd period of the clock signal, the output of PM2 delivers a succession of six values. The first four of these values, referenced 8, 9, 10, 11, have been calculated from the values referenced 8, 9, 10, 11 delivered by the output of A1. They are delayed by a delay T3 equal to fourteen periods of the clock signal, then are stored in device A2 via the coupling device 162. During the 31st and 32nd periods of the clock signal, the values referenced 4 and 5, delivered by the output of PM2 and calculated from the values referenced 4 and 5 delivered by the output of A2, are transmitted by the coupling device 162 to device A3 where they are stored.

During the time from the 31st to the 38th clock period the output of device A3 delivers eight values referenced 0, . . . ,7 which are transmitted to the input of device PM1 to be stored therein. Device PM1 calculates eight values referenced 0, . . . ,7 which are delivered by its output during the time from the 33rd to the 40th clock period. These values form eight first values of the transforms to be calculated.

Because of the two delays T2, the intermediate values referenced 0, . . . ,7 are applied to the input of device A3 in the order corresponding to the order in which these values are outputted from A2. These delays T2 correspond to the time required by PM2 for calculating the values referenced 4 and 5. They allow the values referenced 0 to 3, and the values referenced 6 and 7 to be resynchronized with respect to these values referenced 4 and 5. Delays T1 and T2 play a different role. As is apparent from FIG. 17, these delays separate the calculation into two sets which take place with an interval of about sixteen clock periods. FIG. 15 allowed a delay T1 to be provided for compensating the computation time in device PM2. In fact, the separation of the computation into two sets separated by about sixteen clock periods leads to taking a value T1 equal to 16 periods and not two periods as would be sufficient for compensating the computing time of PM2. Furthermore, this separation of the calculation into two sets does not appear in the diagram of FIG. 15, this is why delay T3 does not appear in this diagram.

The second set of calculations is performed by using again the computing devices A2, pM2. A3 and PM1.

During the time from the 41st to the 44th clock period four values referenced 8 to 11 are stored in device A2 after being delayed by a time T3 by device 162. Then, during the time from the 45th to the 48th clock period, the values referenced 12 to 15, delivered by the output of device A1, are stored in device A2 after being delayed by a delay T1 by device 162.

During the 49th and 50th clock periods, the values referenced 8 and 9 determined by device A2 are transferred and stored in device PM2 and are used for calculating two other values referenced 8 and 9 which are delivered by the output of PM2 during the 51st and 52nd clock periods. As soon as they are available, these values are transmitted by the coupling device 162 to the input of device A3. During the time from the 51set to the 54th clock period, the output of device A2 is connected to the input of device A3 by device 162 for transmitting a delay T2 and storing the values referenced 10 to 13. During the 55th and 56th clock periods, the values referenced 14 and 15 are transmitted by device 162 from the output of device A2 to the input of device PM2. These values are used for calculating two other intermediate values referenced 14 and 15 which are delivered by the output of device PM2 during the 57th and 58th clock periods.

During the time from the 57th to the 62nd clock period the output of device A3 delivers eight values referenced 8, . . . ,15 which are transmitted to the input of device PM1 to be stored therein. Device PM1 calculates eight new values referenced 8, . . . ,15, which are delivered by its output during the 57th to 64th clock periods. These values form the last eight values of the transforms to be calculated.

From the timing diagram of FIG. 17, a table may be drawn up describing connections to be formed between the elementary computing devices for calculating the transforms of the current block.

TABLE No 7

| number of clock periods | Connections to be formed for the transformation of a current block (N = 16) |
|---|---|
| 1–16 | NOTHING |
| 17–24 | A1 - A2 |
| 25–26 | A1-PM2 and A2 - A3(T3) |
| 27–28 | A1 - PM2 - A2(T3) - A3(T2) |
| 29 | A2 - A2(T1) - PM2 - A2(T2) and A2 - A3(T2) |
| 30 | |
| 31–32 | A1 - A2(T1) - A3(T2) - PM1 and PM2 - A3 |
| 33–38 | A3 - PM1 |
| 39–48 | NOTHING |
| 49–50 | A2 - PM2 |
| 51–52 | A2 - A3(T2) and PM2 - A3 |
| 53–54 | A2 - A3(T2) |
| 55–56 | A2 - PM2 and A3 - PM1 |
| 57–58 | PM2 - A3 - PM1 |
| 59–62 | A3 - PM1 |
| 63–64 | NOTHING |

Timing diagrams similar to that of FIG. 17 may be drawn up for the transformation of the three blocks of sixteen values following the current block and the three blocks of sixteen values preceding the current block. The timing diagrams are derived from each other by translations of sixteen clock periods. Similarly, it is possible to draw up a table describing the connections to be formed for the transformation of each of these blocks, by shifting the number of the clock periods in the table established for the transformation of the current block.

During the time of sixty-four clock periods, the transform computing device determines sixty-four transformed values, due to the fact that each elementary computing device operates with a period equal to the time assigned to the calculation of sixteen transforms namely sixteen clock periods. The coupling device 162 which connects these elementary computing devices together operates then with a period equal to sixteen clock periods. The connections to be formed for the simultaneous transformation of four blocks may then be recapitulated in a table corresponding to sixteen clock periods only.

TABLE No 8

| number of clock periods (modulo 16) | Connections to be formed for the simultaneous transformation of four blocks (N = 16): |
|---|---|
| 1 ] | |
| 2 ] | A1 - A2 and A3 - PM1 and A2 - PM2 |
| 3 ] | A1 - A2 and A3 - PM1 and |
| 4 ] | A2 - A3(T2) and PM2 - A3 |
| 5 ] | |
| 6 ] | A1 - A2 and A3 - PM1 and A2 - A3(T2) |
| 7 ] | |
| 8 ] | A1 - A2 and A2 - PM2 and A3 - PM1 |
| 9 ] | |
| 10 ] | A1 - PM2 and A2 - A3(T2) and PM2 - A3 - PM1 |
| 11 ] | |
| 12 ] | A1 - PM2 - A2(T3) - A3(T2) and A3 - PM1 |
| 13 ] | A1 - A2(T1) - PM2 - A2(T3) and |
| 14 ] | A2 - A3(T1) and A3 - PM1 |
| 15 ] | |
| 16 ] | A1 - A2(T1) - A3(T2) - PM1 and PM2 - A3 |

The connection between the output of device A3 and the input of device PMI is permanently provided. The non permanent connections, to be formed by the coupling device 162, are recapitulated in the table below.

TABLE No 9

| number of clock periods (modulo 16) | Recapitulation of the non permanent connections to be formed for the simultaneous transformation of 4 blocks (n + 16), the connection A3-PM1 being permanent: |
|---|---|
| 1 ] | |
| 2 ] | A1 - A2 - PM2 |
| 3 ] | |
| 4 ] | A1 - A2 - A3(T2) and PM2 - A3 |
| 5 ] | |
| 6 ] | A1 - A2 - A3(T2) |
| 7 ] | |
| 8 ] | A1 - A2 - PM2 |
| 9 ] | |
| 10 ] | A1 - PM2 - A3 and A2 - A3(T2) |
| 11 ] | |
| 12 ] | A1 - PM2 - A2(T1) - A3(T2) |
| 13 ] | |
| 14 ] | A1 - A2(T1) - PM2 - A2(T1) - A3(T2) |
| 15 ] | |
| 16 ] | A1 - A2(T1) - A3(T2) and PM2 - A3 |

As was mentioned above, the computing diagram of FIG. 3 is not the only diagram which may be derived from that of FIG. 1 by a permutation of the order of the intermediate values respecting the mathematical relation between these intermediate values, consequently other diagrams similar to that of FIG. 3 may be obtained while complying with the same restriction which consists in calculataing, with a time interval equal to a clock period, the two operand values required for each pair of operations of the multiplication-accumulation type.

For example, in FIG. 3, it is possible to permute the pair of lines leading to values $F_9$ and $F_7$ with a pair of lines leading to values $F_1$ and $F_{15}$. Or else it is possible to permute the pair of lines leading to values $F_3$ and $F_{13}$ with the pair of lines leading to values $F_5$ and $F_{11}$. In these two examples, the calculations in the last but one column on the right may again be performed using a computing device carrying out operations of the type for addition-subtraction of two operands taken from four values, such as A3 in the example of FIG. 15.

Naturally, these variants in the order of the calculations cause variants in the way the elementary computing devices are connected in series for each step of the calculations. The scope of the invention is not then limited to the embodiments described in the above tables, since numerous variants of FIG. 3 are within the scope of a man skilled in the art, as long as he knows the optimum number of elementary computing devices and as long as he knows the rules for attributing calculations to these devices: maximum occupation of the time imparted to processing of a block and permanent maintenance of the largest number possible of connections.

FIG. 18 shows a more detailed block diagram of the embodiment shown in FIG. 16. Adaptations are further provided for using this device for blocks of eight values alternately with blocks of sixteen values. In particular, a switching device 214 allows the computing device A1 to be shunted. This Fiugre represents more particularly an embodiment of an elementary computing device of the first type, A2, an embodiment of an elementary computing device of the second type, PM2, and an embodiment of the coupling device 162. The computing devices A1 and A3 may be formed similarly to device A2. The computing device PM1 may be similarly to device PM2.

The coupling device 162 comprises three buses referenced $B_1, B_2, B_3$ which are shown in FIG. 16 by the vertical conductors of the switching matrix. The horizontal conductors of this switching matrix are formed in fact by registers 200 to 206 whose inputs are connected to these buses $B_1, B_2$ and $B_3$. Registers 200, 203, 204 and 205 have a capacity corresponding to a single digital value. The registers 201, 202, 206 are shift registers having a capacity for providing respectively the delays T1, T3 and T2.

Each of registers 200 to 206 has a clock input causing writing of the digital values present at its input at each clock period, and has a control input for activating an output which is normally at high impedance. This clock input and this control input are connected to control means 163 by connections, not shown in FIG. 18 for the sake of clarity. A first input of the coupling device 162, which is connected to the output of the computing device A1, feeds bus $B_2$ to which are connected a series input of register 200, a series input of register 202 and an input of register 203. The second input of device 162 is connected to the bus $B_1$ to which are connected an input of register 200 and an input of register 205. A third input of device 162 is connected to the bus $B_3$ to which are connected an input of register 204 and a series input of the shift register 206.

An output of register 200, an output of register 201 and an output of register 202 are connected in parallel to a bus 207 forming the first output of device 162. An output of register 203 and an output of register 204 are connected in parallel to a bus 208 forming the third output of device 162. An output of register 205 and a series output of the shift register 206 are connected in parallel to a bus 209 which forms the second output of device 162. Each register 201 to 206 has a clock input receiving a clock signal H delivered by the control means 163 and an input for enabling its output receiving control signals $E_0, E_1, E_2, E_3, E_4, E_5$ and $E_6$ supplied by the control means 163. In the absence of an enabling signal, the output of each of the registers has a high impedance and therefore has no influence on the bus to which it is connected.

These control signals allow the connections mentioned above in table No. 9 to be formed for the blocks of sixteen values or those mentioned in table No. 3 for the blocks of eight values. For transforming blocks of eight values, device A1 is made transparent and devices A2, A3, PM1 and PM2 play the role of devices A4, A5, PM3, PM4 respectively, and the delays T4 and T2 are identical and equal to two clock periods. For example, for connecting the output of computing devices A2 to the input of computing device PM2, the control means generate the signal $E_4$ for enabling transmission of the contents of register 204 to the input of device PM2. Register 204 contains a value which is present on bus $B_3$ and which has been stored under the action of the clock signal H.

The transform computing device receives, at an input terminal 167, a logic signal T which indicates the size of the blocks of values to be processed. This signal controls more particularly the switching device 214 for shunting device A during transformation of blocks of eight values.

In this embodiment, computing device A2, which performs operations for adding or subtracting two operands or so from eight values, comprises: four RAM's 210, 211, 212, 213, having a capacity of sixteen values; a control device 20; an adder-subtractor 215; and a register 216. The input of device A2 is connected to a bus 217 to which are connected in parallel data inputs of the RAM's 210 to 213. The outputs of memories 210 to 212 are connected in parallel to a bus 218 which is connected to a first input of the adder-subtracter 215. An output of memory 211 and an output of memory 213 are connected in parallel to a bus 219 which is connected to a second input of the adder-subtracter 215. An input for controlling addition-subtraction of adder 215 is connected to an output of the control device 220 for receiving a control signal referenced ±. An output of the adder-subtracter 215 is connected to an input of register 216. An output of register 216 forms the output of device A2.

Each of the memories 210 to 213 has a reading control input and a writing control input, connected to outputs of device 220 through connections, not shown in the Figure for the sake of clarity. Device 220 receives the signal T delivered by terminal 167 and receives the clock signal H and an initialization signal I supplied by the control means 163. Device 220 operates with a period equal to sixteen clock periods for transforming blocks of sixteen values and with a period equal to eight clock periods for transforming blocks of eight values, depending on the value of signal T. It receives the signal T supplied by the input terminal 167 and signals H and I supplied by the control means 163.

Device 220 controls writing of the digital values applied to the input of device A2 into memories 210 and 211 during the first eight clock periods and into memories 212 and 213 in the eight following periods. It controls read out from memories 210 and 211 during the eight following periods when it controls writing into memories 212 and 213. During writing into one pair of memories 210 and 212 or 212 and 213, device 220 delivers the same writing address values to the two memories. During read out from two memories 210 and 211 or 212 and 213 device 220 supplies different address values for the two memories in accordance with the diagram of FIG. 3 so as to provide the sum or the difference of two values stored at different memory addresses.

Register 216 has a clock input receiving the clock signal H. It stores the value of the result determined by device A2 before transmitting it to the output of this device A2.

The computing device PM2 comprises: a pair of multipliers-accumulators 232 and 233; a pair of ROM's 230 and 231; a device 234 for controlling the memories 230 and 231; and a register 236. The input of device PM2 is connected to a bus 231 which is connected to a first operand input of the multiplier-accumulator 232 and to a first operand input of the multiplier-accumulator 233. Each of these multipliers-accumulators 232, 233 has a second operand input connected respectively to an output of the ROM 230 and to an output of the ROM 231 and has an output connected to bus 235. Register 236 has an input connected to bus 235, a control input receiving the clock signal H and an output forming the output of device PM2.

The multipliers-accumulators 232 and 233 have a clock input receiving the clock signal H. The ROM's 230 and 231 each have an address input which is connected to an output of the device 234. Device 234 receives the signal T and receives the clock signal H and the initialization signal I which are supplied by the control means 163. Device 234 may be formed mainly of a modulo 8 or modulo 16 counter, the modulo being controlled by the signal T, depending on whether the size of the blocks of values to be transformed is eight or sixteen respectively. The counter counts the clock pulses, modulo 16 or 8, and supplies an identical address to the ROM's 230 and 231. These deliver at their respective outputs predetermined coefficient values which are a function of these addresses and which allow the multiplications-accumulations shown in the diagram of the calculations of FIG. 3 to be carried out.

Construction of the computing device A1 is similar to that of computing device A2. The construction of the computing device A3 is also similar to that of device A2, except for the capacity of memories 210 to 213 which is equal to four values instead of sixteen and the absence of the signal T, for the size of the blocks has no influence on the number of values from which the operands are taken and has no influence on the choice of these values, for the calculations for the blocks of eight values are included in the calculations for the blocks of sixteen values. The construction of device PM1 is quite similar to that of device PM2, only the values of the coefficients are different which are contained in the ROM's 230 and 232 and which conform to those indicated by the computation diagrams of FIG. 3 and FIG. 15.

The output terminal 164 forms the output terminal of the cosine transform computing device and supplies the transform values in the order $R_0, F_8, \ldots, F_{11}$. In applications requiring transforms in the order $F_0, \ldots F_{15}$ a device 165 must further be provided for changing the order of the transforms, having an input connected to the output terminal 164 and an output connected to an output terminal 166 forming a new output terminal of the transform computing device.

The construction of this order change device 165 is within the scope of a man skilled in the art. It may be formed of two RAM's each having a capacity equal to sixteen values and control means for controlling read out and write in from and into these two memories. The values of the transforms supplied by the output terminal 164 are written by blocks of sixteen into one of the memories then are read out by blocks of sixteen in an order corresponding to the desired order. The two memories are used alternately for read out and write in.

The construction of control means 163 is within the scope of a man skilled in the art. They may comprise a clock signal generator synchronized with the digital values supplied to the input terminal 161 and a logic device generating the control signals $E_0, \ldots, E_6$, for example by means of a modulo 16 counter and a ROM.

FIG. 19 shows the diagram of the calculations of FIG. 4, without the connections between the points, and where the rectangles define the operations attributed to elementary computing devices of the first type: $A1'$, $A2'$ $A3'$, and of the second type: $PM1'$, and $PM2'$.

The number of computation operations for the reverse transformation is the same as for forward transformation, for it follows from the diagram of FIG. 3, this diagram being representative of one method of calculating the reverse transformation provided that at least the horizontal time axis is reversed. Three devices of the first type and two devices of the second type are then necessary.

The calculations are attributed to these elementary computing devices by applying the above defined rules.

The calculation operations are attributed so that devices $PM1'$, $A3'$, $A2'$ and $A1'$ each calculate sixteen values during the total time for calculating sixteen reverse transforms. They are thus occupied full time since each device can only devote sixteen clock periods to the total for processing each block of sixteen transform values, the rest of the total computing time being used for simultaneously processing other blocks preceding or following the current block.

Only computing device $PM2'$ is not used full time since it only calculates 10 values during the whole computing time.

The multiplication-accumulation operation shown at the extreme left of each line of the diagram are all attributed to the same device $PM1'$ so that its operand input is permanently connected to the input terminal of the reverse transform computing device. The four sets of operations for addition-subtraction of two operands taken from four values, which follow the operations performed by $PM1'$, are attributed to the same device $A3'$ so that the connection $PM1'$-$A3'$ is permanent.

The first column on the left in the diagram of FIG. 18 comprises four pairs of operations of the multiplication type, which are performed by the device $PM1'$. The second column on the left comprises four first operations of the addition-subtraction type performed by device $A3'$, then four other operations of the addition-subtraction type performed by a device $A3'$, then two pairs of operations of the multiplication-accumulation type performed by the device $PM1'$.

The third column on the left comprises a pair of operations of the multiplication-accumulation type performed by device $PM2'$, then the transmission of four values supplied by A3, with a delay $T2'$, then a pair of multiplication-accumulation operations performed by $PM2'$, then four operations of the addition-subtraction type performed by the device $A3'$, then two pairs of operations of the multiplication-accumulation type performed by the device $PM1'$.

In the fourth column from the left, eight operations of the addition-subtraction type are performed by device $A2'$ then two values are transmitted with delay $T2'$, then two operations of the multiplication-accumulation type are performed by the device $PM2'$, then four operations of the addition-subtraction type are performed by the device $A3'$. In the fifth column from the left four values are transmitted with a delay $T1'$, then two pairs of operations of the multiplication-accumulation type are performed by the device $PM2'$, then eight operations of the addition-subtraction type are performed by the device $A2'$. In the last column on the right, sixteen operations of the addition-subtraction type are performed by the device $A1'$.

The attribution of the computing operations from a diagram similar to that of FIG. 14 but differing by the relative position of the computing lines would lead to the same number of elementary computing devices, there would only be modified the order of the switching operations between these devices and the delays possibly added in the transmission of values from one device to another.

FIG. 20 shows the block diagram of one embodiment of a device for calculating reverse cosine transforms by blocks of sixteen values, in accordance with the invention. This embodiment uses the attribution of computing operations shown in FIG. 19. Besides the computing devices $PM1'$, $PM2'$, $A1'$, $A2'$ and $A3'$, this embodiment comprises a coupling device 192 and control means 193. The control means 193 are connected to control inputs of the computing devices $PM1'$, $pM2'$, $A1'$, $A2'$ and $A3'$ and to a control input of the coupling device 192.

An input terminal 191 receives a succession of transform values and applies them to an operand input of the computing device $PM1'$. This latter has an output connected to an operand input of the computing device $A3'$. The computing device $A1'$ has an output connected to an output terminal 194 forming the output terminal of the reverse cosine transform computing device, supplying a succession of reverse transform values. The switching device 192 has three inputs connected respectively to an output of the computing device $A3'$, to an output of the computing device $A2'$ and to an output of the computing device $PM2'$, and has a first, second and a third output connected respectively to an operand input of the computing device $A2'$, to an operand input of the computing device $A1'$ and to an operand input of the computing device $PM2'$.

The switching device 192 comprises a switching means symbolized by a switching matrix having three vertical conductors and six horizontal conductors, and comprises three delay devices: 195, 196, 197 providing respectively delays $T2'$, $T1'$ and $T3'$. The three vertical conductors of the matrix form the three inputs of device 192. Three horizontal conductors of the matrix form respectively the first, the second and the third output of device 192. Three other horizontal conductors of the matrix are connected respectively to the inputs of the three delay devices 195, 196 and 197. The outputs of the delay devices 195, 196, 197 are connected respectively to the first, second and third output of device 192.

The construction of the elementary computing $A1'$, $A2'$, $A3'$, $PM1'$ and $PM2'$ forming this embodiment is similar to that of the computing devices forming the forward cosine transform computing device shown in FIG. 18. Only the computing coefficients are different. It is within the scope of a man skilled in the art to program to ROM's 230 and 232 and the devices 220 controlling the elementary computing devices, as a function of the values shown in the diagram of FIG. 4 and as a function of the attribution of the computing operations shown in the diagram of FIG. 19.

FIG. 21 shows a timing diagram illustrating the operation of this embodiment for the reverse cosine transformation of a block of sixteen direct transform values. As in the preceding timing diagrams, the values obtained at each step of the calculation are shown by an order number from 0 to 15. In accordance with the diagram of FIG. 4, the transform values are applied in the order: $F_{11}$, $F_5$, $F_{13}$, $F_3$, $F_{15}$, $F_1$, $F_7$, $F_9$, $F_{14}$, $F_6$, $F_{10}$, $F_2$, $F_{12}$, $F_4$, $F_8$, $F_0$. Furthermore, they are applied in two separate packets: the first eight values are separated from the next eight values by a time interval equal to sixteen clock periods. This time interval, as well as the particular order indicated above, may be obtained by an order change device, if the transform values are available in the order of the coefficients of the matrix of the transforms of a block, namely the order $R_0$, . . . $F_{15}$. The construction of such an order change device is within the scope of a man skilled in the art.

The first eight transform values applied to the operand input of device PM1' are stored therein during the first eight clock periods. With a delay equal to two clock periods, device PM1' calculates a succession of eight intermediate values which are immediately stored in device A3'. As soon as four intermediate values have been stored in device A3', this latter calculates a succession of four values which it delivers at its output during the time from the 6th to the 9th clock period. The last four intermediate values are used by device A3' for calculating four other values which it delivers at its output during the 10th to 14th clock periods.

During the 7th and 8th clock periods the two values referenced 0, 1, outputted by device A3', are transferred and stored in device PM2'. During the time from the 9th to the twelfth clock periods the four values referenced 2, 3, 4, 5 delivered by device A3' at its output, are transferred and stored in device A2' via the switching device 192 which delays them by a delay T2' equal to two clock periods. During the 9th and 10th clock periods the values referenced 0, 1, calculated by device PM2', are transmitted without delay by the switching device 192, to the device A2' where they are stored. During the 13th and 14th clock periods, the values referenced 6 and 7 supplied by device A3' are transmitted by the switching device 192 to device PM2'. From these values this latter calculates two intermediate values referenced 6 and 7 which are transmitted by switching device 192 and stored by device A2' during the 15th and 16th clock periods.

At the end of the 16th clock period, device A2' contains eight values referenced 0,1,2,3,4,5,6,7, which allow it to calculate eight values during the next eight clock periods. From the 17th to the 20th clock periods the four values referenced 0,1,2,3, delivered by device A2' at its output, are transmitted with a delay T1' by the switching device 192 to device A1' where they are stored. The delay T1' is equal to sixteen clock periods From the 17th to 24th clock periods, the values referenced 4, 5, 6, 7, delivered by the output of device A2', are transmitted with a delay T3' by the switching device 192 to device PM2' where they are stored during the 35th to 38th clock periods. Delay T3' is equal to 14 clock periods.

During the time from the 25th to the 32nd clock period a second packet of eight transform values is applied to the input of device PM1', in the above indicated order. The values of this second packet are used for a second series of calculations using again the computing devices which were previously used during the time from the first to the 16th clock period. From the 26th to the 32nd clock periods, the values calculated by device PM1' are supplied at its output successively and are transmitted by the switching device 192 to device A3'. This latter calculates a succession of eight intermediate values with a delay of four clock periods, corresponding to the four values required for beginning to carry out a calculation.

During the 31st and 32nd clock periods, the first two values, referenced 8 and 9, delivered by the output of device A3' are transmitted by the switching device 192 with a delay T2' to device A2' where they are stored during the 33rd and 34th clock period. Simultaneously, during this 33rd and 34th clock period, the output of device A3' delivers two values referenced 10 and 11, which are transmitted without delay by the switching device 192 to device PM2'.

During the time from the 33rd to the 38th clock period, device PM2' receives successively six values and calculates, with a delay of two periods, six other values referenced 10, 11, 4, 5, 6, 7. The first two values delivered by the output of device PM2', during the 34th and 35th clock periods, are transmitted by the switching device 192 to device A2'. The last four values delivered by the output of device PM2', referenced four to seven, are transmitted without delay by the switching device 192 to device A1' where they are stored.

During the time from the 41st to the 48th clock periods, device A2' delivers a succession of eight values referenced 8 to 15 which are transmitted by the switching device 192 to device A1'. Thus, during the time from the 33rd to the 48th period device A1' stores a succession of sixteen values which allows a succession of sixteen reverse transform values to be calculated during the time from the 48th to the 64th period.

The total time for this calculation is 64 clock periods but each computing device is only occupied for sixteen clock periods, except for device PM2' which is only occupied for ten periods.

It is then apparent that the processing of following and preceding packets of transform values may be performed in parallel with the processing of the current packet. It is possible to draw up timing diagrams similar to that of FIG. 20 for the preceding packets of values and for the following packets of values, simply by shifting the time scale by a whole number of intervals corresponding to eight clock periods.

From the timing diagram of FIG. 20 a table may be drawn up of the connections to be formed between the elementary computing devices for performing the reverse cosine transformation of the current block.

TABLE No 10

| Number of clock periods | Connections to be formed for the reverse cosine transformation of a current block (N = 16) |
|---|---|
| 1 | |
| 2 | NOTHING |
| 3 | |
| 4 | |
| 5 | PM1' - A3' |
| 6 | |

TABLE No 10-continued

| Number of clock periods | Connections to be formed for the reverse cosine transformation of a current block (N = 16) |
|---|---|
| 7, 8 | PM1' - A3' - PM2' |
| 9, 10 | PM1' - A3' - A2't52') and PM2' - A2' |
| 11, 12 | A3' - A2'(T2') |
| 13, 14 | A3' - PM2' |
| 15, 16 | PM2' - A2' |
| 17, 18, 19, 20 | A2' - A1'(T1') |
| 21, 22, 23, 24 | A2' - PM2'(T3') |
| 25, 26 | NOTHING |
| 27, 28, 29, 30 | PM1' - A3' |
| 31, 32 | PM1' - A3' - A2'(T2') |
| 33, 34 | PM1' - A3' - PM2' |
| 35, 35 | A3' - A2'(T2') and PM2' - A2' |
| 37, 38 | A3' - A2'(T24) and PM2' - A1' |
| 30, 40 | PM2' - A1' |
| 41, 42, 43, 44, 45, 46, 47, 48 | A2( - A1' |
| 49, 50, 51, 52, 53, 54, 55, 56, 57, 58, 59, 60, 61, 62, 63, 64 | NOTHING |

Similar tables may be derived from this for the following blocks and the preceding blocks. Since each computing device and the switching device operate with a period equal to 16 clock periods, these tables may be simplified and only comprise 16 lines. The connections to be formed for the reverse cosine transformation of the following blocks and the preceding blocks may be recapitulated by the following table:

TABLE No 11

| number of clock periods (modulo 16) | Connections to be formed for the reverse cosing transformation of the current block, of the following blocks and of the preceding blocks |
|---|---|
| 1, 2 | A1' - A1'(T1') and PM1 - A3' - PM2' |
| 3, 4 | PM1' - A3' - A2'(T2') - A1'(T1') and PM2' - A2' |
| 5, 6 | PM1 - A3' - A2'(T2') - PM2'(T1') - A1' |
| 7, 8 | PM1' - A3' - PM2' - A1' and A2' - PM2'(T1') |
| 9, 10 | PM1' - AE' - A2'(T2') - A1' and PM2' - A2' |
| 11, 12 | PM1' - A3' - A2'(T2') - A1' |
| 13, 14 | A3' - PM2' and PM1' - A3' and A2' - A1' |
| 15, 16 | PM1' - A3' - A2'(T2') and PM2' - A2' - A1' |

As is shown in FIG. 19, there exists a permanent connection between the output of the computing device PM1' and the input of computing device A3'. This connection is therefore not formed by the switching device 192. The following table recapitulates the non permanent connections which are to be formed by the switching device 192 for the reverse cosine transformation of the current block, of the preceding blocks and of the following blocks.

TABLE No 12

| number of clock periods (modulo 16) | Non permanent connections to be formed for the reverse transformation of the current block, of the following blocks and of the preceding blocks (N = 16) |
|---|---|
| 1, 2 | A3' - PM2' and A2' - A1'(T1') |
| 3, 4 | A3' - A2'(T2') - A1'(T1') and PM2' - A2' |
| 5, 6 | A3' - A2'(T2') - PM2'(T1') - A1' |
| 7, 8 | A3' - PM2' - A1' and A2' - PM2'(T1') |
| 9, 10 | A3' - A2'(T2') - A1' and PM2' - A2' |
| 11, 12 | A3' - A2'(T2') - A1' |
| 13, 14 | A3' - PM2' and A2' - A1' |
| 15, 16 | A3' - A2'(T2') - PM2' - A2' - A1' |

FIG. 22 shows the block diagram of one embodiment of an image coding device in accordance with the invention. This device uses the bidimensional cosine transformation coding process, such a transformation being achieved by means of two monodimensional cosine transform computing devices.

The formula (1) for calculating a bidimensional forward cosine transform may be written in the form:

$$F_b(u,v) = \frac{c(u)}{2N} \cdot \sum_{i=0}^{N-1} a_{iu} \left[ \sum_{j=0}^{N-1} f(i,j) \cdot a_{jv} \right]$$

$$= \frac{c(u)}{2N} \cdot \sum_{i=0}^{N-1} a_{iu} \cdot F(i)$$

$F_b(u,v)$ is equal to the product of a constant, 4, multiplied by the monodimensional transform of a block of values $F(0), \ldots, F(N-1)$, where $F(i)$ is the monodimensional transform of a block of values $f(i,o), \ldots, f(i, N-1)$.

FIG. 22 shows the block diagram of one embodiment of an image coding device in accordance with the invention, comprising two monodimensional direct cosine transform computing devices in accordance with the invention. This coding device comprises: a device 233 for acquiring the values of three color signals R, V, B; a vertical filtering digital device 234, a memory 235 having a capacity corresponding to an image line; two monodimensional forward cosine transform computing devices 236 and 237; two RAM's 238 each having a capacity of sixteen image lines; a coding device 239 and control means 241.

Three analog signals R, V, B are applied respectively to three input terminals 230, 231 and 232 connected to three inputs of device 233. Device 233 samples the three analog signals and restores a succession of digital luminance values Y and a succession of color difference values by alternating the red difference values DR and the blue difference values DB. These digital values are applied respectively to two inputs of the vertical filtering device 234 which suppresses the values of the blue color difference signal for one line out of two and the values of the red color difference signal for the other lines.

The luminance values and the remaining values of the color difference signals are applied to two inputs of memory 235 which stores all these values for an image line and which restores the whole of the luminance values of this line, then the whole of the values of the color difference signal remaining for this line, i.e. either the values DR or the values DB depending on the line considered. Memory 235 separates in time the processing of the luminance values and the processing of the color difference values. At the input of memory 235, the luminance and color difference values for two successive lines are in the following order:

Y, DR, Y, Y, Y, DR, Y, Y, ...
Y, DB, Y, Y, Y, DB, Y, Y, ...

The output of memory 235 delivers successively, at the input of the transformation device 236:

Y,Y,Y,Y,Y, ...
DR, DR, ...
Y,Y,Y,Y,Y, ...
DB, DB, ...

Calculation of the transforms of the luminance values and of the color difference values is performed separately in time, by blocks of sixteen values and by blocks of eight values respectively. The values of a block of luminance values correspond to segments of 16 consecutive image lines. The values of a block of red color difference values correspond to eight lines, i.e. one line out of two of the luminance value block. The values of a block of blue color difference values correspond to the eight other lines of the same block of luminance values.

Memory 235 has a control input connected to an output of the control means 241 for controlling these writing and reading operations. The transformation device 236 has a control input connected to an output of the control means 241 delivering a logic signal T indicating the size of the block to be processed. An output of device 236 is connected to an input of the two RAM's 238. The transformation device 237 has an input and an output connected respectively to an output of memories 238 and to an input of the coding device 239, and has a control input connected to the output of the control means 241 delivering the signal T.

The two RAM's 238 have a control input connected to an input of the control means 241. An output of the coding device 239 is connected to a output terminal 240 which forms the output of the image coding device.

Device 236 calculates the cosine transforms of the luminance values, by monodimensional blocks of sixteen values, for sixteen lines successively, by alternating with the calculation of the cosine transforms by monodimensional blocks of eight values for the color difference signals corresponding to these sixteen lines. After storage of the transforms corresponding to sixteen image lines, the two memories 238 restore these values by applying them to the input of device 237 which calculates the bidimensional cosine transforms from the monodimensional transform values of sixteen lines, for the luminance values, and of eight lines for the color difference values.

One of memories 238 is used for writing, for writing all the values corresponding to a line, then all the values corresponding to the following line, etc up to the 16th line, so as to form a matrix with 16 lines and 16 columns; whereas the other memory is used for reading, for reading all the values from the first column, then all the values from a second column etc, up to the 16th column.

Since the luminance values Y are delivered in the first instance by the output of memory 235, the monodimensional transform of the luminance values are stored in the first place in one of memories 238. Their bidimensional transforms are determined first of all. Then the bidimensional transforms of a block of red color difference values are determined, then the bidimensional transforms of a block of blue color difference values.

The control means 241 deliver the whole of the clock signals synchronizing the image coding device and deliver the reading and writing control signals for memory 235 and the two RAM's 238. The construction of these control means 241 and these memories 235 and 238 is within the scope of a man skilled in the art. The monodimensional cosine transformation devices 236 and 237 may be formed in accordance with the example described above and shown in FIG. 18.

The purpose of the coding device 239 is to reduce the amount of information to be transmitted, it may be formed in accordance with the description given by:

IEEE Transactions on Communications, VOL.COM 32, No. 3, March 1984, "Scene Adaptive Coder", by WEN-HSIUNG CHEN and WILLIAM K.PRATT.

This coding consists in comparing the value of each transform with respect to a threshold value; in considering as null and void the transforms less than the threshold value; in transmitting the value of the transforms which are not null and void by a Huffman code and in transmitting the addresses of these transforms in their matrices by an area code, the length of the areas being itself coded by a Huffman code. Only the first value, F(O,O), of the matrix of transforms is transmitted as absolute value.

Formula (2) for calculating a bidimensional reverse cosine transform may be written in the form:

$$f(i,j) = \sum_{u=0}^{N-1} c(u) \cdot a_{iu} \sum_{v=0}^{N-1} c(v) \cdot F_b(u,v) \cdot a_{jv}$$

$$= \sum_{u=0}^{N-1} b_{iu} \cdot f(u)$$

F(i,j) is therefore equal to the monodimensional reverse transform of a block of values $f(0), \ldots, f(N-1)$ where f(u) is the reverse monodimensional transform of a block of values $F_b(u,0), \ldots, F_b(u,N-1)$.

FIG. 23 shows the block diagram of one embodiment of an image decoding device in accordance with the invention comprising two monodimensional reverse cosine transform computing devices in accordance with the invention. This decoding device comprises: a decoding device 256; two monodimensional reverse cosine transform computing devices 246 and 247: two RAM's 248, the capacity of each corresponding to 16 lines; a RAM's 249, whose capacity corresponds to an image line; a vertical interpolation device 250; a restoration device 251; and control means 252.

An input terminal 245 receives a succession of digital coded values delivered by an image coding device such as the one shown in FIG. 22 and applies them to an input of the decoding device 256. The reverse cosine transform computing device 246 has an input connected to an output of the decoding device 256, a control input connected to an output of the control means 252 delivering a logic signal T', and an output connected to an input of the two RAM's 248.

The reverse transform computing device 247 has an input connected to an output of the two RAM's 248, an output connected to an input of memory 249, and a control input connected to the output of the means 252 delivering the signal T'. Memories 248 further have a control input connected to an output of the control means 252. Memory 249 has two outputs connected respectively to two inputs of the vertical interpolation device 250 and has a control input connected to an output of the control means 252. Device 250 has two outputs connected respectively to two inputs of the restoration device 251. This latter has three outputs connected to three output terminals 253, 254, and 255 of the image decoding device.

The values received by the input terminal 245 are decoded by the decoding device 256 for reconstituting bidimensional cosine transform values. The devices 246 and 247 perform successively two monodimensional reverse cosine transformations. For each succession of 16 image lines, they process successively a block of 16×16 luminance transform values, then two blocks of 8×8 color difference transform values, etc. . . . The two RAM's 248 are used alternately for write-in and read-out for storing, in the form of matrices of 16×16 values or matrices of 8×8, the values of the monodimensional reverse transforms calculated by device 246 for 16 image lines.

The values calculated by device 246 are written into one of memories 248 and form each line of these matrices successively. Then these values are read out and applied to device 247, by reading the values of each column successively, for computing bidimensional reverse transform values. These values of the bidimensional transforms are stored in memory 249 then are read out therefrom in the following order:

Y,DR,Y,Y,Y,DR,Y,Y,etc . . .
Y,DB,Y,Y,Y,DB,Y,Y,etc . . .

For each triplet of image points memory 249 restores successively three luminance values Y and a color difference value DR or DB depending on the line considered. These values are applied to the vertical interpolation device 250 which calculates by interpolation a red color difference value DR and a blue color difference value DB for each image point. These color difference values are then combined with the luminance values Y by the restoration device 51 for determining three color signal values which are reconverted into three analog signals: R, V and B, applied to the output terminals 253, 254 and 255 of the image decoding device.

The control means 252 deliver clock signals to the whole of the device over connections, not shown in the Figure. The construction of means 252 is within the scope of a man skilled in the art, as well as the formation of memories 248 and 249. The decoding device 256 is described in the document mentioned above for the coding device.

The monodimensional transform computing devices of the invention may be applied in all cases where it is required to calculate rapidly and for the least cost bidimensional or monodimensional cosine transforms. These devices may be applied for example in color television image storage or transmission systems, for example digital video tape recorders.

What is claimed is:

1. A device for computing forward monodimensional cosine transform coefficients from a stream of digital source data which has a period T0, by blocks of 8 values, according to a discrete cosine transform method requiring five computational stages, said device comprising:

first shuffle and add circuit means, coupled to receive, first predetermined combinations of said digital source data at an input thereof;

second shuffle and add circuit means for adding and subtracting second predetermined combinations of data provided to an input of said second shuffle and add circuit means;

first shuffle and multiply circuit means for adding and multiplying third predetermined combinations of data provided to an input of said first shuffle and multiply circuit means by an output of second shuffle and add circuit means, and for providing, at an output thereof, a succession of discrete cosine transformed output coefficients;

second shuffle and multiply circuit means for adding and multiplying fourth predetemined combinations of data provided to an input of said second shuffle and multiply circuit means;

coupling means having inputs respectively connected to an output of the first shuffle and add circuit means, and to an output of the second shuffle and multiply circuit means, and having outputs connected to the input of the second shuffle and add circuit means to supply said fourth predetermined combinations of data thereto and to the input of the second shuffle and multiply circuit means to supply said second combination of data thereto; and control means for controlling said first and second shuffle and add circuit means, said first and second shuffle and multiply circuit means, and said coupling means, with a period equal to eight of said periods T0 of said source data as pipeline processors to provide said stream of output coefficients at a same rate as said stream of digital source data.

2. A device according to claim 1, wherein said control means includes means for controlling said coupling means to successively form the connections:

| number of periods T0 (modulo 8) | Connections |
|---|---|
| 1 | |
| 2 | A4 - A5(T4) |
| 3 | |
| 4 | |
| 5 | A4 - PM4 |
| 6 | |
| 7 | A4 - A5(T4) and PM4 - A5 |
| 8 | | wherein the first and second shuffle and add circuit means are respectively referenced by A4 and A5, the second shuffle and multiply circuit means is referenced by PM4, and the values transmitted by the coupling device to said A5 are delayed by a delay T4=2.T0 when the connection transmitting these values is referenced by −A5 (T4).

3. A device for computing forward monodimensional cosine transform coefficients from a stream of digital source data by blocks of 16 values according to a discrete cosine transform method requiring six computational stages, said device comprising:

first shuffle and add circuit means, coupled to receive said digital source data at an input thereof, for adding and subtracting first predetermined combinations of source data provided to said input of said first shuffle and add circuit means;

second shuffle and add circuit means for adding and subtracting second predetermined combinations of data provided to an input of said second shuffle and add circuit means;

third shuffle and add circuit means for adding and subtracting third predetermined combinations of data provided to an input of said third shuffle and add means;

first shuffle and multiply circuit means, coupled to an output of said third shuffle and add circuit means, for adding and multiplying fourth predetermined combinations of data provided to an input of said first shuffle and multiply circuit means, and for providing, at an output thereof, a succession of discrete cosine transformed output coefficients;

second shuffle and multiply circuit means for adding and multiplying fifth predetermined combinations of data provided to an input of said second shuffle and multiply circuit means;

coupling means having inputs respectively connected to outputs of the first and second shuffle and add circuit means, and to an output of the second shuffle and multiply circuit means, and having oututs connected to inputs of the second shuffle and add circuit means to connect said second predetermined combinations of data thereto, to said third shuffle and add circuit means to connect said third predetermined combinations of data thereto, and to said input of second shuffle and multiply circuit means to connect said fifth combinations of data thereto; and control means for controlling said first, second, and third shuffle and add circuit means, said first and second shuffle and multiply circuit means, and said coupling means, with a period equal to 16 periods T0 of said source data, and for controlling said means as pipeline processors to provide said stream of output coefficients at the same rate as said stream of digital source data.

4. A device according to claim 3, wherein said control means includes means for controlling said coupling means to successively form connections:

| number periods T0 (modulo 16) | Connections |
|---|---|
| 1 | A1 - A2 - PM2 |
| 2 | |
| 3 | A1 - A2 - A3(T2) and PM2 - A3 |
| 4 | |
| 5 | A1 - A2 - A3T2) |
| 6 | |
| 7 | A1 - A2- PM2 |
| 8 | |
| 9 | A1 - PM2 - A3 and A2 - A3(T2) |
| 10 | |
| 11 | A1 - PM2 - A2(T3) - A3(T2) |
| 12 | |
| 13 | A1 - A2(T1) - PM2 - A2(T3) - A3(T2) |
| 14 | |
| 15 | A1 - A2(T1) - A3(T2) and PM2 - A3 |
| 16 | | wherein the first, second, and third shuffle and add circuit means are respectively referenced by A1, A2, and A3, the second shuffle and multiply circuit means is referenced by PM2; and the values transmitted by the coupling device to the devices A1, A2, A3 are delayed respectively by a delay T1=16.T0, or T2=2.'T0, or T3=14.T0, when the connection transmitting these values is referenced respectively by −A2(T1), −A3(T2) and A2(T3).

5. A device for computing reverse monodimensional cosine transform coefficients from a stream of digital source data by blocks of 8 values according to a discrete cosine transform method requiring five computational stages, said device comprising:

first shuffle and multiply circuit means for adding and multiplying first predetermined combinations of said digital source data provided to an input of said first shuffle and multiply circuit means;

second shuffle and multiply circuit means for adding and multiplying second predetermined combinations of data provided to an input of said second shuffle and multiply circuit means;

first shuffle and add circuit means for adding and subtracting third predetermined combinations of data provided to an input of said first shuffle and add circuit means, and for providing, at an output thereof, a succession of reverse discrete cosine transformed output coefficients;

second shuffle and add circuit means, coupled to an output of said first shuffle and add circuit means to receive fourth predetermined combinations of data, for adding and subtracting said fourth predetermined combinations of data;

coupling means having inputs connected to an output of the second shuffle and add circuit means, and to an output of the second shuffle and multiply circuit means, and having outputs connected to the input of first shuffle and add circuit means to connect said third predetermined coefficients thereto, and to the input of the second shuffle and multiply circuit means to connect said second predetermined coefficients thereto; and control means for delivering control signals to control inputs of said first and second shuffle and add circuit means, said first and second shuffle and multiply circuit means, and said coupling means, with a period equal to 8 periods T0 of said source data, and for controlling said means as pipeline processors to provide said stream of output coefficients at the same rate as said stream of digital source data.

6. A device according to claim 5, wherein said control means includes means for controlling said coupling means to successively form connections:

| number of clock periods (modulo 8) | Connections |
|---|---|
| 1 | A5' - PM4' |
| 2 | |
| 3 | A5' - A4'(T4') and PM4' - A4' |
| 4 | |
| 5 | A5' - A4'(T4') |
| 6 | |
| 7 | |
| 8 | | wherein the first and second shuffle and add circuit means are respectively referenced by A4' and A5', the second shuffle and multiply circuit means are referenced by PM4', and the values transmitted by the coupling device to the device A4' are delayed by a delay T4'=2.T0 when a connection is referenced by −A4'(T4').

7. A device for computing reverse monodimensional cosine transform coefficients from a stream of digital source data, by blocks of 16 values, according to a discrete cosine transformation method requiring six computational stages, said device comprising:

first shuffle and multiply circuit means, for multiplying and adding first predetermined combinations of source data provided to an input of said first shuffle circuit means;

second shuffle and multiply circuit means, for multiplying and adding second predetermined combinations of data provided to an input of said second shuffle and multiply circuit means;

first shuffle and add circuit means, for adding and subtracting third predetermined combinations of data provided to an input of said means, and for producing, at an output thereof, a succession of reverse discrete cosine transform output coefficients;

second shuffle and add circuit means, for adding and subtracting fourth predetermined combinations of data provided to an input of said means;

third shuffle and add circuit means, for adding and subtracting fifth predetermined combinations of data provided to an input of said means;

coupling means, having inputs respectively connected to outputs of the second and third shuffle and add circuit means, and to an output of the second shuffle and multiply circuit means, and having outputs connected to said input of the first shuffle and add circuit means to provide said first predetermined combinations thereto, coupled to the second shuffle and add circuit means to provide said second predetermined combinations thereto, and to said second shuffle and multiply circuit means to provide said fourth predetermined combinations thereto; and control means for controlling said first, second, and third shuffle and add circuit means, said first and second shuffle and multiply circuit means, and said coupling means, with a period equal to 16 periods T0 of source data, and for controlling said means as pipeline processors to provide said stream of output coefficients at a same rate as said stream of digital source data.

8. A device according to claim 7, wherein said control means includes means for controlling said coupling means to successively form connections:

| number of clock periods (modulo 16) | Connections |
|---|---|
| 1 | A3' - PM2' and A2' - A1'(T1') |
| 2 | |
| 3 | A3' - A2'(T2') - A1'(T1') and PM2' - A2' |
| 4 | |
| 5 | A3' - A2'(T2') - PM2'(T1') - A1' |
| 6 | |
| 7 | A3' - PM2' - A1' and A2' - PM2'(T1') |
| 8 | |
| 9 | A3' - A2'(T2') - A1' and PM2' - A2' |
| 10 | |
| 11 | A3' - PM2' and A2' - A1' |
| 12 | |
| 13 | A3' - PM2' and A2' - A1' |
| 14 | |
| 15 | A3' - A2'(T2') - PM2' - A2' - A1' |
| 16 | | wherein the first, second, and third shuffle and add circuit means are respectively referenced by A1', A2', and A3'; the second shuffle and multiply circuit means is referenced by PM2'; the values transmitted by the coupling device to the devices A1', A2', PM2', are delayed respectively by a delay T1=8.T0, or T2=2.T0, or T3=7.T0, and the connection transmitting these values is referenced respectively by −A1'(T1'), −A2'(T2') and −PM2'(T3').

9. A device for coding images by a bidimensional forward cosine transform, having an input receiving a succession of values which represent image elements, comprising:

a first RAM for storing values representing elements of one image line;

a first monodimensional forward cosine transform computing device for computing forward monodimensional cosine transform coefficients from a stream of first digital source data, by blocks of 8 values, according to a discrete cosine transform method requiring five computational stages, said first device comprising:

(a) first shuffle and add circuit means, coupled to receive said first digital source data, of a period T0, at an input thereof, first predetermined combinations of said source data received at said input;

(b) second shuffle and add circuit means for adding and subtracting second predetermined combinations of data provided to an input of said second shuffle and add circuit means;

(c) first shuffle and multiply circuit means for adding and multiplying third predetermined combinations of data provided to an input of said first shuffle and multiply circuit means by an output of second shuffle and add circuit means, and for providing, at an output thereof, a first succession of discrete cosine transformed output coefficients;

(d) second shuffle and multiply circuit means for adding and multiplying fourth predetermined combinations of data provided to an input of said second shuffle and multiply circuit means;

(e) coupling means having inputs respectively connected to an output of the first shuffle and add circuit means, and to an output of the second shuffle and multiply circuit means, and having outputs connected to the input of the second shuffle and add circuit means to supply said fourth predetermined combinations of data thereto and to the input of the second shuffle and multiply circuit means to supply said second combination of data thereto; and (f) control means for controlling said first and second shuffle and add circuit means, first and second shuffle and multiply circuit means, and said coupling means, with a period equal to 8 of said periods T0 of said source data as pipeline processors to provide said stream of output coefficients at a same rate as said stream of digital source data;

an input of said first device coupled to an output of the first RAM to receive said first source data therefrom, for transforming blocks of 8 values stored in the first RAM;

a second RAM coupled to an output of the first cosine transform computing device, for storing transformed values computed by said first computing device and corresponding to 8 image lines; and a second monodimensional forward cosine transform computing device for computing second forward monodimensional cosine transform coefficients from a stream of second digital source data, by blocks of 8 values, according to a discrete cosine transform method requiring five computational stages, said second device comprising:

(a) first shuffle and add circuit means, coupled to receive said second source data, of a period T0, at an input thereof, first predetermined combinations of said second source data received at said input;

(b) second shuffle and add circuit means for adding and subtracting second predetermined combinations of data provided to an input of said second shuffle and add circuit means;

(c) first shuffle and multiply circuit means for adding and multiplying third predetermined combinations of data provided to an input of said first shuffle and multiply circuit means by an output of second shuffle and add circuit means, and for providing, at an output thereof, a second succession of discrete cosine transformed output coefficients;

(d) second shuffle and multiply circuit means for adding and multiplying fourth predetermined combinations of data provided to an input of said second shuffle and multiply circuit means;

(e) coupling means having inputs respectively connected to an output of the first shuffle and add circuit means, and to an output of the second shuffle and multiply circuit means, and having outputs connected to the input of the second shuffle and add circuit means to supply said fourth predetermined combinations of data thereto and to the input of the second shuffle and multiply circuit means to supply said second combination of data thereto; and (f) control means for controlling said first and second shuffle and add circuit means, said first and second shuffle and multiply circuit means, and said coupling means, with a period equal to eight of said periods T0 of said source data as pipeline processors to provide said stream of output coefficients at a same rate as said stream of digital source data;

said second device having an input coupled of an output of the second RAM to receive said second source data therefrom, for transforming blocks of 8 values stored in the second RAM, having an output coupled to the output of the image coding device to supply said image coding device with bidimensional cosine transformed values of the values representing the image elements.

10. A device for decoding images by a bidimensional reverse cosine transform, having an input receiving a succession of values which are bidimensional cosine transformed values representing image elements, comprising:

a first monodimensional reverse cosine transform computing device for computing reverse monodimensional cosine transform coefficients from a first stream of digital source data by blocks of 8 values according to a discrete cosine transform method requiring five computational stages, said first computing device comprising:

(a) first shuffle and multiply circuit means for adding and multiplying first predetermined combinations of first source data provided to an input of said first shuffle and multiply circuit means;

(b) second shuffle and multiply means for adding and multiplying second predetermined combinations of data provided to an input of said second shuffle and multiply circuit means;

(c) first shuffle and add circuit means for adding and subtracting third predetermined combinations of data provided to an input of said first shuffle and add circuit means, and for providing, at an output thereof, a first succession of reverse discrete cosine transformed output coefficients;

(d) second shuffle and add circuit means coupled to an output of said first shuffle and add circuit means, for adding an output of first shuffle and add circuit means as fourth predetermined combinations of data, and subtracting said fourth predetermined combinations of data provided to an input of said means;

(e) coupling means having inputs connected to an output of the second shuffle and add circuit means, and to an output of the second shuffle and multiply circuit means, and having outputs connected to the input of first shuffle and add circuit means to connect said third predetermined coefficients thereto, and to the input of the second shuffle and multiply circuit means to connect said second predetermined coefficients thereto; and (f) control means for delivering control signals to control inputs of said first and second shuffle and add circuit means, said first and second shuffle and multiply circuit means, and said coupling means, with a period equal to eight periods T0 of said source data, and for controlling said means as pipeline processors to provide said stream of output coefficients at the same rate as said stream of digital source data;

said first computing device having an input coupled to the input of the image coding device and receiving transformed values;

a first RAM having an input coupled to an output of said first computing device for storing blocks of 8 values computed by said first computing device;

a second monodimensional reverse cosine transform computing device for computing reverse monodimensional cosine transform coefficients from a second stream of digital source data by blocks of 8 values according to a discrete cosine transform method requiring five computational stages, said second computing device comprising:

(a) first shuffle and multiply circuit means for adding and multiplying first predetermined combinations of source data provided to an input of said first shuffle and multiply circuit means;

(b) second shuffle and multiply means for adding and multiplying second predetermined combinations of data provided to an input of said second shuffle and multiply circuit means;

(c) first shuffle and add circuit means for adding and subtracting third predetermined combinations of data provided to an input of said first shuffle and add circuit means, and for providing, at an output thereof, a second succession of reverse discrete cosine transformed output coefficients;

(d) second shuffle and add circuit means coupled to an output of said first shuffle and add circuit means, for adding an output of first shuffle and add circuit means as fourth predetermined combinations of data, and subtracting said fourth predetermined combinations of data provided to an input of said means;

(e) coupling means having inputs connected to an output of the second shuffle and add circuit means, and to an output of the second shuffle and multiply circuit means, and having outputs connected to the input of first shuffle and add circuit means to connect said third predetermined coefficients thereto, and to the input of the second shuffle and multiply circuit means to connect said second predetermined coefficients thereto; and (f) control means for delivering control signals to control inputs of said first and second shuffle and add circuit means, said first and second shuffle and multiply circuit means, and said coupling means, with a period equal to eight periods T0 of said source data, and for controlling said means as pipeline processors to provide said stream of output coefficients at the same rate as said stream of digital source data;

said second computing device having an input coupled to an output of said first computing device, for transforming blocks of 8 values stored in the first RAM; and a second RAM having an input coupled to an output of said second computing device, for storing blocks of 8 values computed by the second transform computing device, and having an output coupled to an output of the image decoding device to supply a succession of values representing image elements.

11. A device for coding images by a dimensional forward cosine transform, having an input receiving a succession of values represent image elements, comprising:

a first RAM for storing values representing elements of one image line;

a first monodimensional forward cosine transform computing device for computing forward monodimensional cosine transform coefficients from a stream of digital source data, by blocks of 16 values, according to a discrete cosine transform method requiring six computational stages, said first device comprising:

(a) first shuffle and add circuit means, coupled to receive first source data at an input thereof, for adding and subtracting first predetermined combinations of source data provided to an input of said first shuffle and add circuit means;

(b) second shuffle and circuit means for adding and subtracting second predetermined combinations of data provided to an input of said second shuffle and add circuit means;

(c) third shuffle and add circuit means for adding and subtracting third predetermined combinations of data provided to an input of said third shuffle and add circuit means;

(d) first shuffle and multiply circuit means, coupled to an output of said third shuffle and add circuit means, for adding and multiplying fourth predetermined combinations of data provided to an input of said first shuffle and multiply circuit means, and for providing at an output thereof, a succession of discrete cosine transformed output coefficients;

(e) second shuffle and multiply circuit means for adding and multiplying fifth predetermined combinations of data provided to an input of said second means shuffle and multiply circuit means;

(f) coupling means having inputs respectively connected to outputs of the first and second shuffle and add circuit means, and to an output of the second shuffle and multiply circuit means, and having outputs connected to inputs of the second shuffle and add circuit means to connect said second predetermined combination of data thereto to third shuffle and add circut means to connect said third predetermined combination of data thereto, and to said input of second shuffle and multiply circuit means to connect said fifth combination of data thereto; and (g) control means for controlling said first, second, and third shuffle and add circuit means, said first and second shuffle and multiply circuit means, and said coupling means, with a period equal to 16 periods T0 of said source data, and for controlling said means as pipeline processors to provide said stream of output coefficients at the same rate as said stream of digital source data;

said first device having an input coupled to an output of the first RAM to receive said first source data therefrom for transforming blocks of sixteen values stored in the first RAM;

a second RAM coupled to an output of the first transform computing device for storing transformed values computed by said first computing device and corresponding to sixteen image lines; and a second monodimensional forward cosine transform computing device for computing forward monodimensional cosine transform coefficients from a stream of digital source data, by blocks of 16 values, according to a discrete cosine transform method requiring six computational stages, said device comprising:
- (a) first shuffle and add circuit means, coupled to receive second source data at an input thereof, for adding and subtracting first predetermined combinations of source data provided to an input of said first shuffle and add circuit means;
- (b) second shuffle and circuit means for adding and subtracting second predetermined combinations of data provided to an input of said second shuffle and add circuit means;
- (c) third shuffle and add circuit means for adding and subtracting third predetermined combinations of data provided to an input of said third shuffle and add means;
- (c) first shuffle and multiply circuit means, coupled to an output of said third shuffle and add circuit means, for adding and multiplying fourth predetermined combinations of data provided to an input of said first shuffle and multiply circuit means, and for providing at an output thereof, a succession of discrete cosine transformed output coefficients;
- (e) second shuffle and multiply circuit means for adding and multiplying fifth predetermined combinations of data provided to an input of said second means shuffle and multiply circuit means;
- (f) coupling means having inputs respectively connected to outputs of the first and second shuffle and add circuit means, and to an output of the second shuffle and multiply circuit means, and having outputs connected to inputs of the second shuffle and add circuit means to connect said second predetermined combination of data thereto to third shuffle and add circuit means to connect said third predetermined combination of data thereto, and to said input of second shuffle and multiply circuit means to connect said fifth combination of data thereto; and control means for controlling said first, second, and third shuffle and add circuit means, said first and second shuffle and multiply circuit means, and said coupling means, with a period equal to 16 periods T0 of said source data, and for controlling said means as pipeline processors to provide said stream of output coefficients at the same rate as said stream of digital source data;

said second device having an input coupled to an output of the second RAM, to receive said second source data therefrom for transforming blocs of 16 values stored in the second RAM, having an output coupled to the output of the image coding device to supply it with bidimensional cosine transformed values of the values representing the image elements.

12. A device for decoding images by a bidimensional reverse cosine transform, having an input receiving a succession of values which are bidimensional cosine transformed values of values representing image elements, comprising:
- a first monodimensional reverse cosine transform computing device for computing reverse monodimensional cosine transform coefficients from a stream of digital source data, by blocks of 16 values, according to a discrete cosine transformation method requiring six computational stages, said device comprising:
- (a) first shuffle and multiply circuit means, for multiplying and adding first predetermined combinations of source data provided to an input of said first means shuffle circuit means;
- (b) second shuffle and multiply circuit means, for multiplying and adding second predetermined combinations of data provided to an input of said second shuffle and multiply circuit means;
- (c) first shuffle and add circuit means, for adding and subtacting third predetermined combinations of data provided to an input of said means, and for producing at an output thereof a first succession of reverse discrete cosine transform output coefficients;
- (d) second shuffle and add circuit means, for adding and subtracting fourth predetermined combinations of data provided to an input of said means;
- (e) third shuffle and add circuit means, for adding and subtracting fifth predetermined combinations of data provided to an input of said means;
- (f) coupling means, having inputs respectively connected to outputs of the second and third shuffle and add circuit means, and to an output of the second shuffle and multiply circuit means, and having outputs connected to said input of the first shuffle and add circuit means to provide said first predetermined combination thereto, the second shuffle and add circuit means to provide said second predetermined combination thereto, and to said second shuffle and multiply circuit means to provide said fourth combination thereto; and
- (g) control means for controlling said first, second, and third shuffle and add circuit means, said first and second shuffle and multiply circuit means, and said coupling means, with a period equal to 16 periods T0 of source data, and for controlling said means as pipeline processors to provide said stream of output coefficients at a same rate as said stream of digital source data;

said first computing device having an input coupled to the input of said image decoding device and receiving transformed values;

a first RAM having an input coupled to an output of said first computing device for storing blocks of 16 values computed by said first computing device;

a second monodimensional reverse cosine transform computing device for computing reverse monodimensional cosine transform coefficients from a stream of digital source data, by blocks of 16 values, according to a discrete cosine transformation method requiring six computational stages, said device comprising:
- (a) first shuffle and multiply circuit means, for multiplying and adding first predetermined combinations of source data provided to an input of said first means shuffle circuit means;
- (b) second shuffle and multiply circuit means, for multiplying and adding second predetermined combinations of data provided to an input of said second shuffle and multiply circuit means;
- (c) first shuffle and add circuit means, for adding and subtracting third predetermined combinations of data provided to an input of said means, and for producing at an output thereof a succession of reverse discrete cosine transform output coefficients;

(d) second shuffle and add circuit means, for adding and subtracting fourth predetermined combinations of data provided to an input of said means;

(e) third shuffle and add circuit means, for adding and subtracting fifth predetermined combinations of data provided to an input of said means;

(f) coupling means, having inputs respectively connected to outputs of the second and third shuffle and add circuit means, and to an output of the second shuffle and multiply circuit means, and having outputs connected to said input of the first shuffle and add circuit means to provide said first predetermined combination thereto, the second shuffle and add circuit means to provide said second predetermined combination thereto, and to said second shuffle and multiply circuit means to provide said fourth combination thereto; and (g) control means for controlling said first, second, and third shuffle and add circuit means, said first and second shuffle and multiply circuit means, and said coupling means, with a period equal to 16 periods T0 of source data, and for controlling said means as pipeline processors to provide said stream of output coefficients at a same rate as said stream of digital source data;

said second computing device having an input coupled to an output of the first monodimensional reverse cosine transform computing device, for transforming blocks of 16 values stored in the first RAM; and a second RAM having an input coupled to an output of the second transform computing device, for storing blocks of 16 values computed by the second transform computing device, and having an output coupled to an output of the image decoding device to supply a succession of values representing image elements.

* * * * *